US012561149B2

(12) United States Patent
Zhang et al.

(10) Patent No.: US 12,561,149 B2
(45) Date of Patent: Feb. 24, 2026

(54) INTERFACE DISPLAY METHOD AND ELECTRONIC DEVICE

(71) Applicant: Huawei Technologies Co., Ltd., Shenzhen (CN)

(72) Inventors: Wei Zhang, Shenzhen (CN); Jiechun Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 173 days.

(21) Appl. No.: 18/271,957

(22) PCT Filed: Dec. 22, 2021

(86) PCT No.: PCT/CN2021/140486
§ 371 (c)(1),
(2) Date: Jul. 12, 2023

(87) PCT Pub. No.: WO2022/151937
PCT Pub. Date: Jul. 21, 2022

(65) Prior Publication Data
US 2024/0069937 A1    Feb. 29, 2024

(30) Foreign Application Priority Data
Jan. 13, 2021    (CN) .......................... 202110045127.5

(51) Int. Cl.
*G06F 9/451* (2018.01)
*G06T 1/20* (2006.01)
*G06T 11/20* (2006.01)

(52) U.S. Cl.
CPC ............... *G06F 9/451* (2018.02); *G06T 1/20* (2013.01); *G06T 11/203* (2013.01); *G06T 2200/24* (2013.01); *G06T 2210/62* (2013.01)

(58) Field of Classification Search
CPC .. G06F 9/451; G06T 2200/24; G06T 2210/62
See application file for complete search history.

(56) References Cited

U.S. PATENT DOCUMENTS

2015/0062136 A1* 3/2015 Yamauchi ............... G06T 11/20
345/522
2017/0228902 A1* 8/2017 Yoshimura .............. G06T 11/40
2020/0051202 A1* 2/2020 Tamatam .................. G06T 1/20

FOREIGN PATENT DOCUMENTS

CN        110427094 A    11/2019

OTHER PUBLICATIONS

Pateria Shubham et al: "Multiple mixer based multi cycle layer composition for power efficient display pipeline", 2015 International Conference on Computing andNetwork Communications (COCONET), IEEE, Dec. 16, 2015 (Dec. 16, 2015), pp. 318-325, XP032866207.

* cited by examiner

*Primary Examiner* — Phuong H Nguyen
(74) *Attorney, Agent, or Firm* — Slater Matsil, LLP

(57)        ABSTRACT

In accordance with an embodiment, an interface display method includes: obtaining a first drawing instruction of a first interface; when an interface attribute of the first interface comprises a complex attribute, inserting a complex drawing instruction into the first drawing instruction to obtain a second drawing instruction; rendering the first interface based on the second drawing instruction; after rendering the first interface, setting the interface attribute of the first interface to a non-complex attribute; and combining the first interface and a second interface by using a hardware combiner.

20 Claims, 16 Drawing Sheets

Electronic device

FIG. 7C

Rounded corner

Rounded corner

Rounded corner

Rounded corner

Rounded corner

R

```
xxx 12:00:51.016  xxx/ xxx D/ xxx: Root (RootRenderNode 0x7823cd5700)
```

Insert a complex rendering instruction (for example, (ClipRRect 363, 766, 1043, 1815, 222.48)) here

```
xxx 12:00:51.016  xxx/ xxx D/ xxx: drawDrawable
xxx 12:00:51.016  xxx/ xxx D/ xxx: drawPaint
xxx 12:00:51.016  xxx/ xxx D/ xxx: drawRenderNode (DecorView 0x7823cd4300)
xxx 12:00:51.016  xxx/ xxx D/ xxx: (Clip to outline with bounds 0.00, 0.00, 1080.00, 2244.00)
xxx 12:00:51.016  xxx/ xxx D/ xxx: drawRenderNode (ColorDrawable 0x7823cd6100)
xxx 12:00:51.016  xxx/ xxx D/ xxx: drawRect
xxx 12:00:51.016  xxx/ xxx D/ xxx: /RenderNode(ColorDrawable 0x7823cd6100)
xxx 12:00:51.016  xxx/ xxx D/ xxx: drawDrawable
xxx 12:00:51.016  xxx/ xxx D/ xxx: drawRenderNode (LinearLayout 0x7823cd4800)
xxx 12:00:51.016  xxx/ xxx D/ xxx: (ClipRect 0, 0, 1080, 2244)
xxx 12:00:51.016  xxx/ xxx D/ xxx: clipRect
xxx 12:00:51.016  xxx/ xxx D/ xxx: drawDrawable
xxx 12:00:51.016  xxx/ xxx D/ xxx: drawRenderNode (FrameLayout 0x7823cd5200)
xxx 12:00:51.016  xxx/ xxx D/ xxx: (Translate (left, top) 0, 81)
xxx 12:00:51.016  xxx/ xxx D/ xxx: (ClipRect 0, 0, 1080, 2163)
xxx 12:00:51.016  xxx/ xxx D/ xxx: drawDrawable
xxx 12:00:51.016  xxx/ xxx D/ xxx: drawDrawable
xxx 12:00:51.016  xxx/ xxx D/ xxx: /RenderNode(FrameLayout 0x7823cd5200)
xxx 12:00:51.016  xxx/ xxx D/ xxx: drawDrawable
xxx 12:00:51.016  xxx/ xxx D/ xxx: /RenderNode(LinearLayout 0x7823cd4800)
xxx 12:00:51.016  xxx/ xxx D/ xxx: drawRenderNode (View 0x7823cd5c00)
xxx 12:00:51.016  xxx/ xxx D/ xxx: (ClipRect 0, 0, 1080, 81)
xxx 12:00:51.016  xxx/ xxx D/ xxx: drawRenderNode (ColorDrawable 0x7823cd6600)
xxx 12:00:51.016  xxx/ xxx D/ xxx: drawRect
xxx 12:00:51.016  xxx/ xxx D/ xxx: /RenderNode(ColorDrawable 0x7823cd6600)
xxx 12:00:51.016  xxx/ xxx D/ xxx: /RenderNode(View 0x7823cd5c00)
xxx 12:00:51.016  xxx/ xxx D/ xxx: drawDrawable
xxx 12:00:51.016  xxx/ xxx D/ xxx: /RenderNode(DecorView 0x7823cd4300)
xxx 12:00:51.016  xxx/ xxx D/ xxx: drawDrawable
xxx 12:00:51.016  xxx/ xxx D/ xxx: /RenderNode(RootRenderNode 0x7823cd5700)
```

FIG. 10

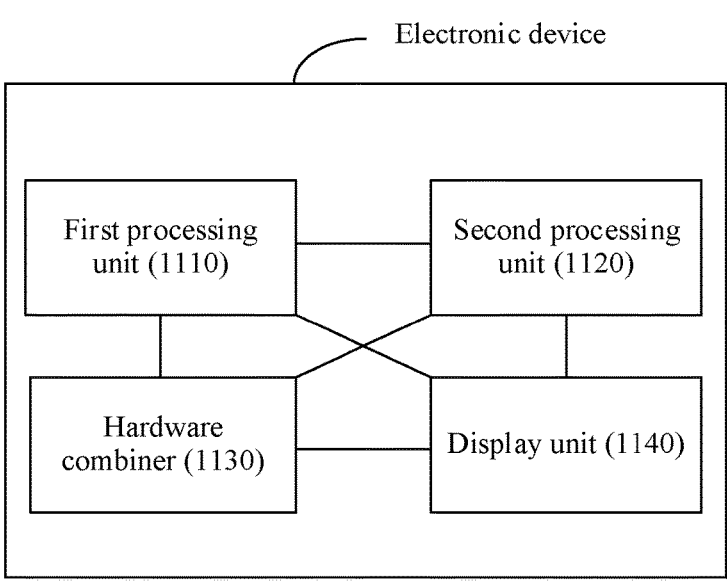

Electronic device

First processing unit (1110)

Second processing unit (1120)

Hardware combiner (1130)

Display unit (1140)

FIG. 11

INTERFACE DISPLAY METHOD AND ELECTRONIC DEVICE

CROSS-REFERENCE TO RELATED APPLICATIONS

This application is a National Stage of International Application No. PCT/CN2021/140486 filed on Dec. 22, 2021, which claims priority to Chinese Patent Application No. 202110045127.5 filed on Jan. 13, 2021. Both of the aforementioned applications are hereby incorporated by reference in their entireties.

TECHNICAL FIELD

Embodiments of this application relate to the field of electronic technologies, and in particular, to an interface display method and an electronic device.

BACKGROUND

As functions of an electronic device become increasingly powerful and are designed more user-friendly, interface attributes of the electronic device become more complex. For example, more interface windows are designed to be displayed in rounded corners or with specific transparency. For another example, more interface windows include a large quantity of complex icons. For another example, a plurality of windows or a plurality of layers are displayed on a display of the electronic device simultaneously. To ensure smooth display of interfaces, requirements on performance of the electronic device are increasingly high.

However, a conventional hardware combiner is not capable of combining the interfaces having complex attributes described above. In this case, the hardware combiner usually returns an interface combination task to a graphics processing unit (graphics processing unit, GPU), causing a high load on the GPU. The high load of the GPU reduces a frame rate, resulting in interface jitter or freezing. In addition, the high load of the GPU also increases power consumption of the electronic device.

SUMMARY

Embodiments of this application provide an interface display method and an electronic device, to improve display effect of an interface with a complex attribute, reduce power consumption, and improve user experience.

To achieve the foregoing objectives, the following technical solutions are used in embodiments of this application.

According to a first aspect, an interface display method is provided, where the method is applied to an electronic device, and the method includes: obtaining a first drawing instruction of a first interface; when an interface attribute of the first interface includes a complex attribute, inserting a complex drawing instruction into the first drawing instruction to obtain a second drawing instruction; rendering the first interface based on the second drawing instruction; setting the interface attribute of the first interface to a non-complex attribute; and combining the first interface and a second interface by using a hardware combiner.

According to the technical solutions provided in the first aspect, when recognizing that an interface includes a complex attribute, the electronic device may insert, in advance into a drawing instruction that is obtained through drawing, a drawing instruction corresponding to the complex attribute, and modify the interface attribute to a non-complex attribute, so that the hardware combiner can successfully perform subsequent interface combination. The method can improve display effect of the interface with the complex attribute, for example, resolve interface jitter or freezing occurring when the interface with the complex attribute is displayed, and can reduce power consumption and improve user experience.

In a possible implementation, the complex attribute includes one or more of the following: a rounded corner feature, a transparency feature, a multi-complex icon feature, or a multi-window/multi-layer feature. The foregoing non-complex attribute includes an interface attribute other than the foregoing complex attribute. In this application, when recognizing that the interface includes any complex attribute, for example, the rounded corner feature, the transparency feature, the multi-complex icon feature, or the multi-window/multi-layer feature, the electronic device may perform drawing, rendering, and combination by using the interface display method provided in this application, to improve the display effect of the interface.

In a possible implementation, after the obtaining a first drawing instruction of a first interface, the method further includes: The electronic device obtains the interface attribute of the first interface by monitoring interface information. In an implementation, the electronic device may determine, by monitoring the interface attribute, whether the interface includes the complex attribute.

In a possible implementation, the complex attribute includes the rounded corner feature. The complex drawing instruction is used to describe layer information corresponding to the complex attribute, and the layer information includes coordinate information of the rounded corner and a radius of the rounded corner. In some cases, if the interface has the rounded corner feature, the electronic device may insert, in advance into the drawing instruction obtained through drawing, a drawing instruction that indicates information such as the coordinate information of the rounded corner and the radius of the rounded corner, to achieve display effect of a layer corresponding to the rounded corner feature.

In a possible implementation, the complex attribute includes the transparency feature. The complex drawing instruction is used to describe layer information corresponding to the complex attribute, and the layer information includes coordinate information and transparency information of a transparency region. In some cases, if the interface has the transparency feature, the electronic device may insert, in advance into the drawing instruction obtained through drawing, a drawing instruction that indicates information such as the coordinate information and transparency information of the transparency region, so that display effect of a layer corresponding to the transparency feature is not affected.

In a possible implementation, the complex attribute includes the multi-complex icon feature. The complex drawing instruction is used to describe layer information corresponding to the complex attribute, and the layer information includes coordinate information and icon configuration information of a complex icon. In some cases, if the interface has the multi-complex icon feature, the electronic device may insert, in advance into the drawing instruction obtained through drawing, a drawing instruction that indicates information such as the coordinate information and the icon configuration information of the complex icon, so that display effect of a layer corresponding to the multi-complex icon feature is not affected.

In a possible implementation, the complex attribute includes the multi-window/multi-layer feature. The complex drawing instruction is used to describe layer information corresponding to the complex attribute, and the layer information includes coordinate information of a window and a display style of the window. In some cases, if the interface has the multi-window/multi-layer feature, the electronic device may insert, in advance into the drawing instruction obtained through drawing, a drawing instruction that indicates information such as the coordinate information of the window and the display style of the window, so that display effect of a layer corresponding to the multi-window/multi-layer feature is not affected.

In a possible implementation, the first interface is a first application interface. The second interface includes one or more of the following: a home screen of the electronic device, a second application interface, a floating window interface, or a status bar of the electronic device. In this application, the electronic device may perform interface combination by using the hardware combiner based on a specific display status on a display. For example, when one or more corresponding layers of the home screen of the electronic device, the second application interface, the floating window interface, or the status bar of the electronic device are displayed on the display, interface combination is performed on the one or more layers and the first interface by using the hardware combiner, so that display effect of the entire interface is not affected.

In a possible implementation, the obtaining a first drawing instruction of a first interface includes: drawing a layer corresponding to the non-complex attribute of the first interface, to obtain the first drawing instruction. In this application, the electronic device inserts, into a drawing instruction that corresponds to the non-complex attribute and that is obtained through drawing, the drawing instruction corresponding to the complex attribute.

In a possible implementation, the inserting a complex drawing instruction into the first drawing instruction to obtain a second drawing instruction includes: obtaining an interface canvas of the first interface; drawing, on the interface canvas, a layer corresponding to the first drawing instruction; drawing, on the interface canvas, a layer corresponding to the complex drawing instruction; and obtaining the layer information on the interface canvas, to obtain the second drawing instruction. In an implementation, the electronic device may draw, on the interface canvas obtained through drawing, the drawing instruction corresponding to the complex drawing instruction, to insert the complex drawing instruction into the first drawing instruction.

In a possible implementation, the method further includes: The electronic device displays the first interface; or the electronic device sends a configuration parameter of the first interface to another device, to project the first interface onto the another device. The interface display method provided in this application is applicable to a scenario in which the first interface is displayed on the electronic device, and is also applicable to a scenario in which the first interface is extended to be displayed on another device.

According to a second aspect, an electronic device is provided. The electronic device includes: a first processing unit, configured to: obtain a first drawing instruction of a first interface; and when an interface attribute of the first interface includes a complex attribute, insert a complex drawing instruction into the first drawing instruction to obtain a second drawing instruction; a second processing unit, configured to: render the first interface based on the second drawing instruction; and set the interface attribute of the first interface to a non-complex attribute; and a hardware combiner, configured to combine the first interface and a second interface.

According to the technical solutions provided in the second aspect, when the first processing unit recognizing that an interface includes a complex attribute, the electronic device may insert, in advance into a drawing instruction obtained through drawing, a drawing instruction corresponding to the complex attribute. The second processing unit renders the first interface based on the second drawing instruction, and modifies the interface attribute to the non-complex attribute, so that the hardware combiner can successfully perform subsequent interface combination. The method can improve display effect of the interface with the complex attribute, for example, resolve interface jitter or freezing occurring when the interface with the complex attribute is displayed, and can reduce power consumption and improve user experience.

In a possible implementation, the complex attribute includes one or more of the following: a rounded corner feature, a transparency feature, a multi-complex icon feature, or a multi-window/multi-layer feature. The foregoing non-complex attribute includes an interface attribute other than the foregoing complex attribute. In this application, when recognizing that the interface includes any complex attribute, for example, the rounded corner feature, the transparency feature, the multi-complex icon feature, or the multi-window/multi-layer feature, the electronic device may perform drawing, rendering, and combination by using the interface display method provided in this application, to improve the display effect of the interface.

In a possible implementation, the first processing unit is further configured to: after obtaining the first drawing instruction of the first interface, obtain the interface attribute of the first interface by monitoring interface information. In an implementation, the electronic device may determine, by monitoring the interface attribute, whether the interface includes the complex attribute.

In a possible implementation, the complex attribute includes the rounded corner feature. The complex drawing instruction is used to describe layer information corresponding to the complex attribute, and the layer information includes coordinate information of the rounded corner and a radius of the rounded corner. In some cases, if the interface has the rounded corner feature, the electronic device may insert, in advance into the drawing instruction obtained through drawing, a drawing instruction that indicates information such as the coordinate information of the rounded corner and the radius of the rounded corner, to achieve display effect of a layer corresponding to the rounded corner feature.

In a possible implementation, the complex attribute includes the transparency feature. The complex drawing instruction is used to describe layer information corresponding to the complex attribute, and the layer information includes coordinate information and transparency information of a transparency region. In some cases, if the interface has the transparency feature, the electronic device may insert, in advance into the drawing instruction obtained through drawing, a drawing instruction that indicates information such as the coordinate information and transparency information of the transparency region, so that display effect of a layer corresponding to the transparency feature is not affected.

In a possible implementation, the complex attribute includes the multi-complex icon feature. The complex drawing instruction is used to describe layer information corresponding to the complex attribute, and the layer information includes coordinate information and icon configuration information of a complex icon. In some cases, if the interface has the multi-complex icon feature, the electronic device may insert, in advance into the drawing instruction obtained through drawing, a drawing instruction that indicates information such as the coordinate information and the icon configuration information of the complex icon, so that display effect of a layer corresponding to the multi-complex icon feature is not affected.

In a possible implementation, the complex attribute includes the multi-window/multi-layer feature. The complex drawing instruction is used to describe layer information corresponding to the complex attribute, and the layer information includes coordinate information of a window and a display style of the window. In some cases, if the interface has the multi-window/multi-layer feature, the electronic device may insert, in advance into the drawing instruction obtained through drawing, a drawing instruction that indicates information such as the coordinate information of the window and the display style of the window, so that display effect of a layer corresponding to the multi-window/multi-layer feature is not affected.

In a possible implementation, the first interface is a first application interface. The second interface includes one or more of the following: a home screen of the electronic device, a second application interface, a floating window interface, or a status bar of the electronic device. In this application, the electronic device may perform interface combination by using the hardware combiner based on a specific display status on a display. For example, when one or more corresponding layers of the home screen of the electronic device, the second application interface, the floating window interface, or the status bar of the electronic device are displayed on the display, interface combination is performed on the one or more layers and the first interface by using the hardware combiner, so that display effect of the entire interface is not affected.

In a possible implementation, the first processing unit is specifically configured to draw a layer corresponding to the non-complex attribute of the first interface, to obtain the first drawing instruction. In this application, the electronic device inserts, into a drawing instruction that corresponds to the non-complex attribute and that is obtained through drawing, the drawing instruction corresponding to the complex attribute.

In a possible implementation, the first processing unit is specifically configured to: obtain an interface canvas of the first interface on which a layer corresponding to the first drawing instruction is drawn; draw, on the interface canvas, a layer corresponding to the complex drawing instruction; and obtain the layer information on the interface canvas, to obtain the second drawing instruction. In an implementation, the electronic device may draw, on the interface canvas obtained through drawing, the drawing instruction corresponding to the complex drawing instruction, to insert the complex drawing instruction into the first drawing instruction.

In a possible implementation, the electronic device further includes a display unit, configured to display the first interface. The interface display method provided in this application is applicable to a scenario in which the first interface is displayed on the electronic device.

In a possible implementation, the electronic device further includes a transceiver unit, configured to send a configuration parameter of the first interface to another device, to project the first interface onto the another device. The interface display method provided in this application is applicable to a scenario in which the first interface is extended to be displayed another device.

In a possible implementation, the first processing unit is a central processing unit (central processing unit, CPU), or the first processing unit is a graphics processing unit (graphics processing unit, GPU).

According to a third aspect, an electronic device is provided. The electronic device includes: a memory, configured to store a computer program; a processor, configured to: execute the computer program, so that the electronic device obtains a first drawing instruction of a first interface, and when an interface attribute of the first interface includes a complex attribute, insert a complex drawing instruction into the first drawing instruction to obtain a second drawing instruction, render the first interface based on the second drawing instruction, and set the interface attribute of the first interface to a non-complex attribute; and a hardware combiner, configured to combine the first interface and a second interface.

According to the technical solutions provided in the third aspect, when the first processing unit recognizing that an interface includes a complex attribute, the electronic device may insert, in advance into a drawing instruction obtained through drawing, a drawing instruction corresponding to the complex attribute. The second processing unit renders the first interface based on the second drawing instruction, and modifies the interface attribute to the non-complex attribute, so that the hardware combiner can successfully perform subsequent interface combination. The method can improve display effect of the interface with the complex attribute, for example, resolve interface jitter or freezing occurring when the interface with the complex attribute is displayed, and can reduce power consumption and improve user experience.

In a possible implementation, the complex attribute includes one or more of the following: a rounded corner feature, a transparency feature, a multi-complex icon feature, or a multi-window/multi-layer feature. The foregoing non-complex attribute includes an interface attribute other than the foregoing complex attribute. In this application, when recognizing that the interface includes any complex attribute, for example, the rounded corner feature, the transparency feature, the multi-complex icon feature, or the multi-window/multi-layer feature, the electronic device may perform drawing, rendering, and combination by using the interface display method provided in this application, to improve the display effect of the interface.

In a possible implementation, the processor is further configured to execute the computer program, so that the electronic device obtains the interface attribute of the first interface by monitoring interface information after obtaining the first drawing instruction of the first interface. In an implementation, the electronic device may determine, by monitoring the interface attribute, whether the interface includes the complex attribute.

In a possible implementation, the complex attribute includes the rounded corner feature. The complex drawing instruction is used to describe layer information corresponding to the complex attribute, and the layer information includes coordinate information of the rounded corner and a radius of the rounded corner. In some cases, if the interface has the rounded corner feature, the electronic device may insert, in advance into the drawing instruction obtained through drawing, a drawing instruction that indicates information such as the coordinate information of the rounded corner and the radius of the rounded corner, to achieve display effect of a layer corresponding to the rounded corner feature.

In a possible implementation, the complex attribute includes the transparency feature. The complex drawing instruction is used to describe layer information corresponding to the complex attribute, and the layer information includes coordinate information and transparency information of a transparency region. In some cases, if the interface has the transparency feature, the electronic device may insert, in advance into the drawing instruction obtained through drawing, a drawing instruction that indicates information such as the coordinate information and transparency information of the transparency region, so that display effect of a layer corresponding to the transparency feature is not affected.

In a possible implementation, the complex attribute includes the multi-complex icon feature. The complex drawing instruction is used to describe layer information corresponding to the complex attribute, and the layer information includes coordinate information and icon configuration information of a complex icon. In some cases, if the interface has the multi-complex icon feature, the electronic device may insert, in advance into the drawing instruction obtained through drawing, a drawing instruction that indicates information such as the coordinate information and the icon configuration information of the complex icon, so that display effect of a layer corresponding to the multi-complex icon feature is not affected.

In a possible implementation, the complex attribute includes the multi-window/multi-layer feature. The complex drawing instruction is used to describe layer information corresponding to the complex attribute, and the layer information includes coordinate information of a window and a display style of the window. In some cases, if the interface has the multi-window/multi-layer feature, the electronic device may insert, in advance into the drawing instruction obtained through drawing, a drawing instruction that indicates information such as the coordinate information of the window and the display style of the window, so that display effect of a layer corresponding to the multi-window/multi-layer feature is not affected.

In a possible implementation, the first interface is a first application interface. The second interface includes one or more of the following: a home screen of the electronic device, a second application interface, a floating window interface, or a status bar of the electronic device. In this application, the electronic device may perform interface combination by using the hardware combiner based on a specific display status on a display. For example, when one or more corresponding layers of the home screen of the electronic device, the second application interface, the floating window interface, or the status bar of the electronic device are displayed on the display, interface combination is performed on the one or more layers and the first interface by using the hardware combiner, so that display effect of the entire interface is not affected.

In a possible implementation, the processor is specifically configured to execute the computer program, so that the electronic device draws a layer corresponding to the non-complex attribute of the first interface, to obtain the first drawing instruction. In this application, the electronic device inserts, into a drawing instruction that corresponds to the non-complex attribute and that is obtained through drawing, the drawing instruction corresponding to the complex attribute.

In a possible implementation, the processor is specifically configured to execute the computer program, so that the electronic device obtains an interface canvas of the first interface on which a layer corresponding to the first drawing instruction is drawn; draws, on the interface canvas, a layer corresponding to the complex drawing instruction; and obtains the layer information on the interface canvas, to obtain the second drawing instruction. In an implementation, the electronic device may draw, on the interface canvas obtained through drawing, the drawing instruction corresponding to the complex drawing instruction, to insert the complex drawing instruction into the first drawing instruction.

In a possible implementation, the electronic device further includes a display, configured to display the first interface. The interface display method provided in this application is applicable to a scenario in which the first interface is displayed on the electronic device.

In a possible implementation, the electronic device further includes a transceiver, configured to send a configuration parameter of the first interface to another device, to project the first interface onto the another device. The interface display method provided in this application is applicable to a scenario in which the first interface is extended to be displayed another device.

In a possible implementation, the processor includes a CPU and a GPU.

According to a fourth aspect, a computer-readable storage medium is provided, where the computer-readable storage medium stores computer program code, and when the computer program code is executed by a processor, the method according to any possible implementation of the first aspect is implemented.

According to a fifth aspect, a chip system is provided. The chip system includes a processor and a memory, where the memory stores computer program code, and when the computer program code is executed by the processor, the method according to any possible implementation of the first aspect is implemented. The chip system may include a chip, or may include a chip and another discrete component.

According to a sixth aspect, a computer program product is provided. When the computer program product is run on a computer, the method according to any possible implementation of the first aspect is implemented.

BRIEF DESCRIPTION OF THE DRAWINGS

FIG. 7C is an example diagram of another piece of interface combination layer information according to an embodiment of this application;

FIG. 10 is an example diagram of inserting a complex drawing instruction according to an embodiment of this application;

FIG. 11 is a block diagram of a structure of an electronic device according to an embodiment of this application;

DETAILED DESCRIPTION OF ILLUSTRATIVE EMBODIMENTS

Figure 1:
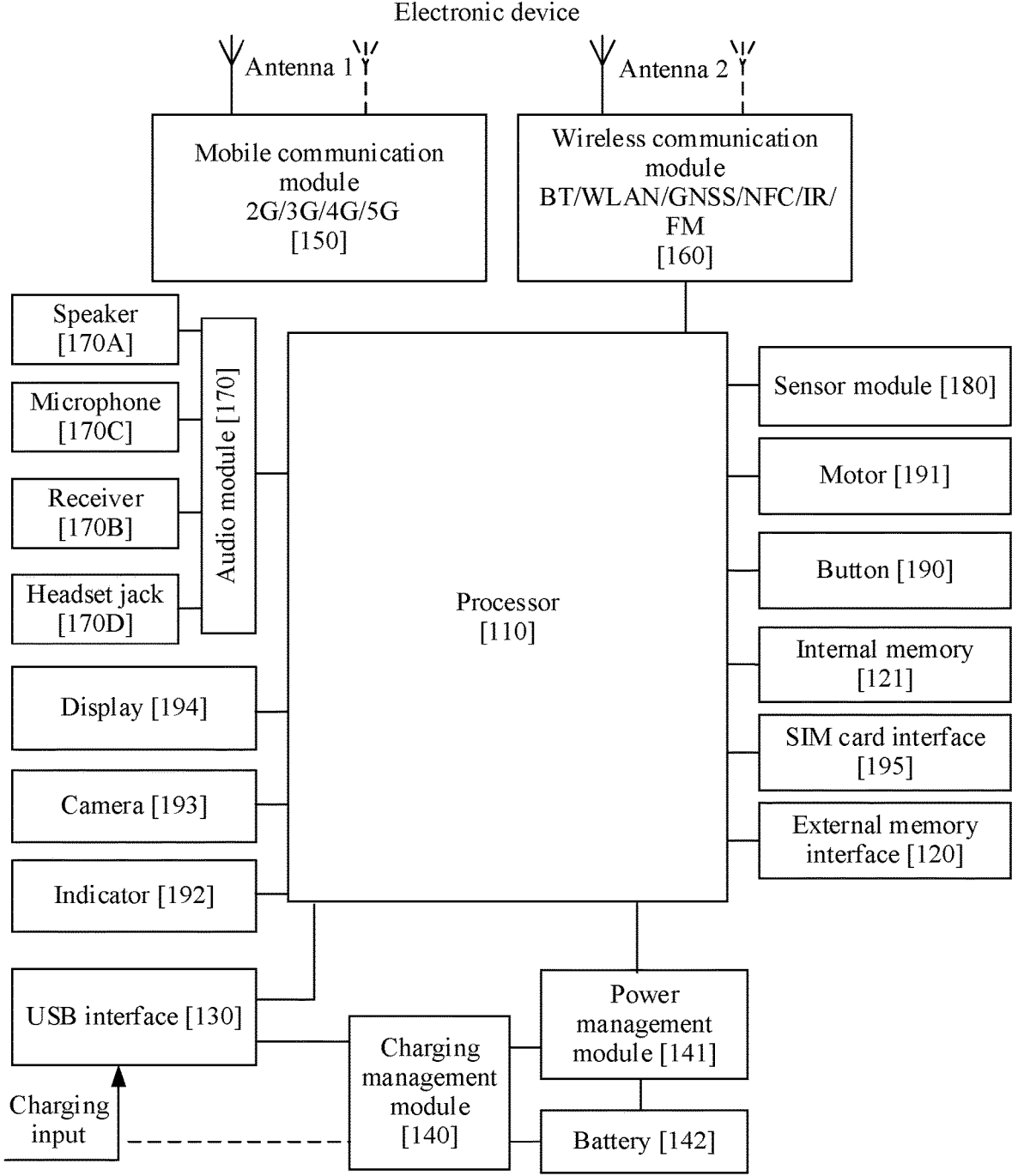
FIG. 1 is a schematic diagram of a hardware structure of an electronic device according to an embodiment of this application.

The following describes the technical solutions in embodiments of this application with reference to the accompanying drawings in embodiments of this application. In description in embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in embodiments of this application, "a plurality of" means two or more.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of the embodiments, unless otherwise specified, "a plurality of" means two or more.

An embodiment of this application provides an interface display method. The method may be applied to a process in which an electronic device displays one or more interfaces in a window.

In this application, an interface attribute of the one or more interfaces in the window includes a complex attribute. The complex attribute may include but is not limited to one or more of a rounded corner feature, a transparency feature, a multi-complex icon feature, a multi-window/multi-layer feature, or the like. Descriptions of the complex attribute are described in detail below.

A specific display scenario of an interface is not limited in this application. For example, the method provided in this embodiment of this application may be applied to a process in which the electronic device displays a window of an application A in response to an operation of starting an application A by a user. For another example, the method provided in this embodiment of this application may be applied to a process in which the electronic device slides and displays a plurality of interface windows (such as application windows) in response to an operation of dragging the application windows by a user through gesture navigation.

The electronic device may include but is not limited to an electronic device including a display, for example, a smartphone, a netbook, a tablet computer, a smart watch, a smart band, a telephone watch, a smart camera, a palmtop computer, a personal computer (personal computer, PC), a personal digital assistant (personal digital assistant, PDA), a portable multimedia player (portable multimedia player, PMP), an augmented reality (Augmented Reality, AR)/virtual reality (Virtual Reality, VR) device, a television, a projection device, or a somatosensory game machine in a human-computer interaction scenario. Alternatively, the electronic device may be an electronic device of another type or structure. This is not limited in this application.

FIG. 1 is a schematic diagram of a hardware structure of an electronic device according to an embodiment of this application by using a smartphone as an example. As shown in FIG. 1, the electronic device may include a processor 110, a memory (including an external memory interface 120 and an internal memory 121), a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor, a gyroscope sensor, a barometric pressure sensor, a magnetic sensor, an acceleration sensor, a range sensor, an optical proximity sensor, a fingerprint sensor, a temperature sensor, a touch sensor, an ambient light sensor, a bone conduction sensor, and the like.

It may be understood that the structure illustrated in this embodiment of the present invention does not constitute a specific limitation on the electronic device. In other embodiments of this application, the electronic device may include more or fewer components than those shown in the figure, or combine some components, or split some components, or have a different component arrangement. The components in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the electronic device. The controller may complete instruction fetching based on an instruction, and generate an operation control signal, to complete control of instruction execution.

A memory may further be disposed in the processor 110, and is configured to store instructions and data. In some embodiments, the memory in the processor 110 is a cache memory. The memory may store an instruction or data that has been used or cyclically used by the processor 110. If the processor 110 needs to use the instructions or the data again, the processor may directly invoke the instructions or the data from the memory. This avoids repeated access and reduces waiting time of the processor 110, so that system efficiency is improved.

In some embodiments, the processor no may be a general purpose central processing unit (central processing unit, CPU), a microprocessor, an application-specific integrated circuit (application-specific integrated circuit, ASIC), or one or more integrated circuits configured to control program execution of the solutions in this application. The processor no may include one or more CPUs. For example, the processor no may be a Kirin 960 chip of Huawei.

In some embodiments of this application, the GPU may be configured to draw an image frame.

In some embodiments of this application, further, the GPU may be further configured to render the image frame after completing drawing of the image frame.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The charging management module 140 is configured to receive a charging input from a charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device. The charging management module 140 may further supply power to the electronic device by using the power management module 141 while charging the battery 142.

The power management module 141 is configured to connect to the battery 142, the charging management module 140, and the processor 110. The power management module 141 receives an input of the battery 142 and/or an input of the charging management module 140, and supplies power to the processor 110, the internal memory 121, the display 194, the camera assembly 193, the wireless communication module 160, and the like. The power management module 141 may be further configured to monitor a parameter such as a battery capacity, a battery cycle count, or a battery health status (electric leakage or impedance). In some other embodiments, the power management module 141 may alternatively be disposed in the processor 110. In some other embodiments, the power management module 141 and the charging management module 140 may be alternatively disposed in a same component.

A wireless communication function of the electronic device may be implemented by using the antenna 1, the antenna 2, the mobile communication module 150, the wireless communication module 160, the modem processor, the baseband processor, and the like.

The antenna 1 and the antenna 2 are configured to send and receive an electromagnetic wave signal. Each antenna of the electronic device may be configured to cover one or more communication frequency bands. Different antennas may further be multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution that includes wireless communication such as 2G/3G/4G/5G and that is applied to the electronic device. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and send a processed electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that includes a wireless local area network (wireless local area network, WLAN) (for example, a Wi-Fi network), Bluetooth BT, a global navigation satellite system (global navigation satellite system, GNSS), frequency modulation (frequency modulation, FM), a near field communication (near field communication, NFC) technology, an infrared (infrared, IR) technology, or the like and that is applied to the electronic device. The wireless communication module 160 may be one or more components integrating at least one communication processor module. The wireless communication module 160 receives an electromagnetic wave by the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device, the antenna 1 and the mobile communication module 150 are coupled, and the antenna 2 and the wireless communication module 160 are coupled, so that the electronic device can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLO-NASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The electronic device implements a display function by using the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs, which execute program instructions to generate or change display information. In this embodiment of this application, the GPU may be configured to: convert and drive display information required by the computer system, provide a row scanning signal to the display, and control correct display of the display.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diodes, QLED), or the like. In some embodiments, the electronic device may include one or N displays 194, where N is a positive integer greater than 1.

In this embodiment of this application, the GPU may be configured to render an application interface. Correspondingly, the display 194 may be configured to display an application interface obtained through rendering by the GPU. In some embodiments of this application, the GPU may be configured to render the image frame after the CPU completes drawing of the image frame. In some embodiments of this application, further, an image frame obtained through rendering by the GPU may be sent to the display 194 for display.

The electronic device may implement an image shooting function by using the ISP, the camera assembly 193, the video codec, the GPU, the display 194, the application processor, and the like.

The external memory interface 120 may be configured to connect to an external storage card, for example, a micro SD card, to extend a storage capability of the electronic device. The external storage card communicates with the processor

110 through the external memory interface 120, to implement a data storage function. For example, files such as music and videos are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (such as audio data and a phone book) created when the electronic device is used, and the like. In addition, the internal memory 121 may include a high-speed random access memory, or may include a nonvolatile memory, for example, at least one magnetic disk storage device, a flash memory, or a universal flash storage (universal flash storage, UFS). The processor 110 runs the instructions stored in the internal memory 121 and/or the instructions stored in the memory disposed in the processor, to execute various function applications of the electronic device and data processing.

The electronic device may implement audio functions, for example, music playing and recording, by using the audio module 170, the speaker 170A, the receiver 170B, the microphone 170C, the application processor, and the like. For specific working principles and functions of the audio module 170, the speaker 170A, the receiver 170B, and the microphone 170C, refer to descriptions in a conventional technology.

The button 190 includes a power button, a volume button, and the like. The button 190 may be a mechanical button, or may be a touch-sensitive button. The electronic device may receive a button input, and generate a button signal input related to user settings and function control of the electronic device.

It should be noted that the hardware modules included in the electronic device shown in FIG. 1 are merely described as examples, and a specific structure of the electronic device is not limited. For example, the electronic device may further include another functional module.

In this application, an operating system of the electronic device may include but is not limited to operating systems such as Symbian® (Symbian®), Android® (Android®), Windows®, iOS® (iOS®), Blackberry® (Blackberry®), and Harmony (Harmony). This is not limited in this application.

Figure 2:
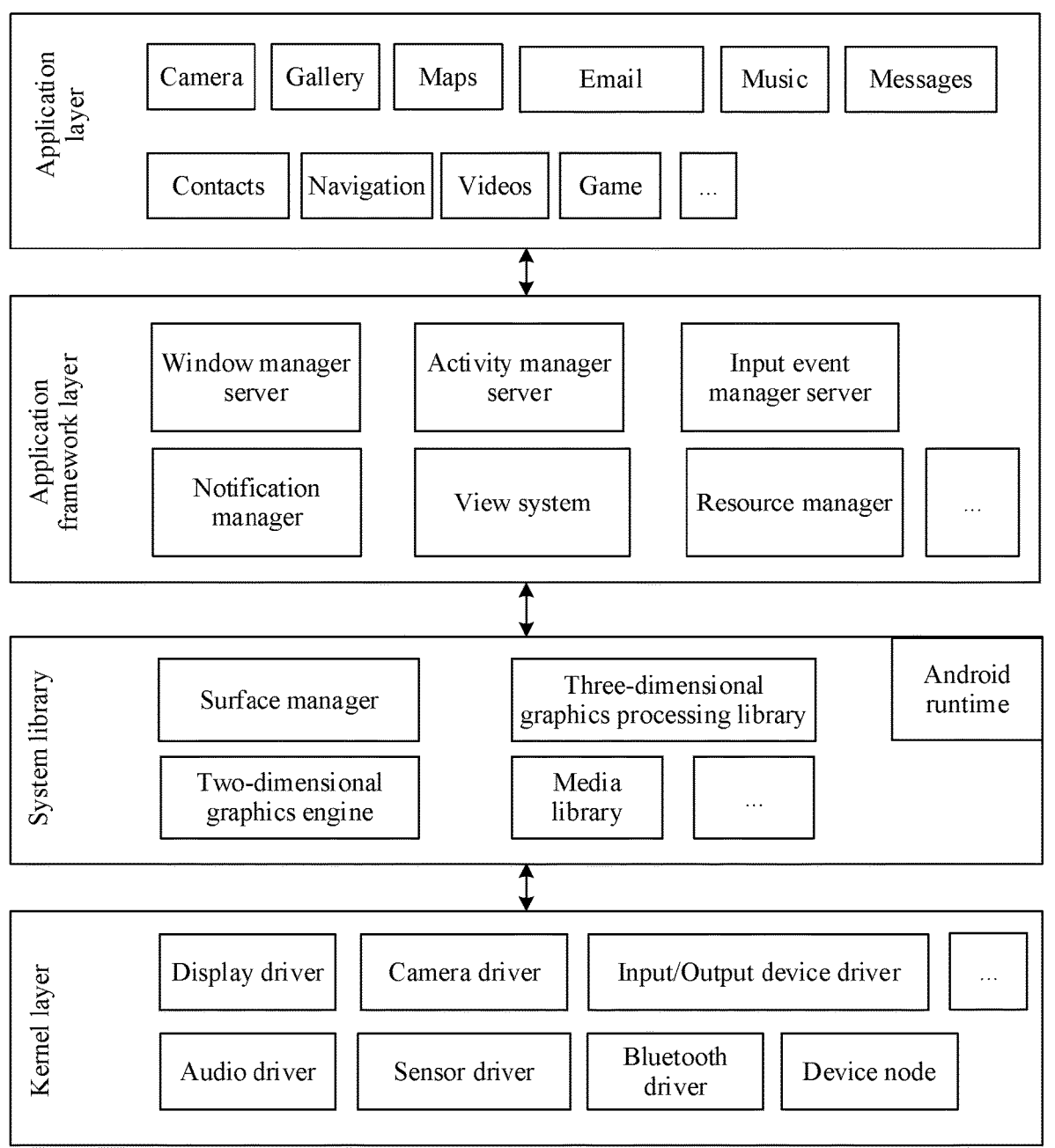
FIG. 2 is a schematic diagram of a software structure of an electronic device according to an embodiment of this application.

In FIG. 2, a schematic diagram of a software structure of an electronic device according to an embodiment of this application is described in detail by using an Android operating system as an example.

As shown in FIG. 2, the Android operating system may include an application layer, an application framework layer (framework, FWK), a system library, Android runtime, and a kernel layer (kernel).

The application layer may provide some core applications. For ease of description, an application program is briefly described as an application below. Applications at the application layer may include a native application (for example, an application installed on the electronic device when the operating system is installed before the electronic device is delivered from a factory), for example, Camera, Maps, Messages, Gallery, Email, and Contacts shown in FIG. 2. The applications in the application layer may also include a third-party application (for example, an application that is downloaded and installed by a user from an application store), for example, Videos, Game, and Music shown in FIG. 2.

The application framework layer provides an application programming interface (application programming interface, API) and a programming framework for an application at the application layer. The application framework layer includes some predefined functions. As shown in FIG. 2, the application framework layer may include a window manager server (window manager service, WMS), an activity manager server (activity manager service, AMS), an input event manager server (input manager service, IMS), a resource manager, a notification manager, and a view system.

The WMS is mainly configured to manage a window program. The window manager server may obtain a size of a display, determine whether there is a status bar, perform screen locking, take a screenshot, and the like.

The AMS is configured to manage an activity, and is responsible for work such as startup, switching, and scheduling of each component in a system, and management and scheduling of an application.

The IMS is mainly configured to perform processing such as translation and encapsulation on an original input event, obtain an input event that contains more information, and send the input event to the WMS. The WMS stores a tappable region (for example, a control) of each application, location information of a focus window, and the like. Therefore, the WMS can correctly distribute the input event to a specified control or focus window. For example, in this embodiment of this application, the IMS may be configured to distribute a received touch event or the like to a specified control or focus window.

The view system includes visual controls such as a control for displaying a text and a control for displaying an image. The view system may be mainly configured to construct an application. A display interface may include one or more views. For example, a display interface including a notification icon of Messages may include a text display view and an image display view. For example, in this embodiment of this application, the view system may be configured to construct a text control, an image control, or the like on an interface displayed on the electronic device.

The notification manager enables an application to display notification information in the status bar, and may be configured to convey a notification message. The notification manager may automatically disappear after a short pause without user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The resource manager is mainly configured to provide various resources such as a localized character string, an icon, an image, a layout file, and a video file for an application. For example, in this embodiment of this application, the resource manager may be configured to provide a localized character string, an icon, an image, a layout file, a video file, an audio file, or the like for an interface displayed on the electronic device.

The system library and Android runtime include functions that need to be invoked by the FWK, an Android core library, and an Android virtual machine. The system library may include a plurality of functional modules, for example, a surface manager, a three-dimensional graphics processing library, a two-dimensional graphics engine, and a media library.

The kernel layer is the basis of the Android operating system. Final functions of the Android operating system are implemented at the kernel layer. The kernel layer may include a display driver, an input/output device driver (for example, a keyboard, a touchscreen, a headset, a speaker, or a microphone), a device node, a Bluetooth driver, a camera driver, an audio driver, a sensor driver, and the like. The user performs an input operation by using an input device, and the kernel layer may generate a corresponding original input event based on the input operation, and store the original input event in the device node.

It should be noted that FIG. 2 describes the software structure of the electronic device by using only the Android system with a layered architecture as an example. A specific architecture of the software system of the electronic device is not limited in this application. For specific descriptions of a software system of another architecture, refer to a conventional technology.

Figure 3:
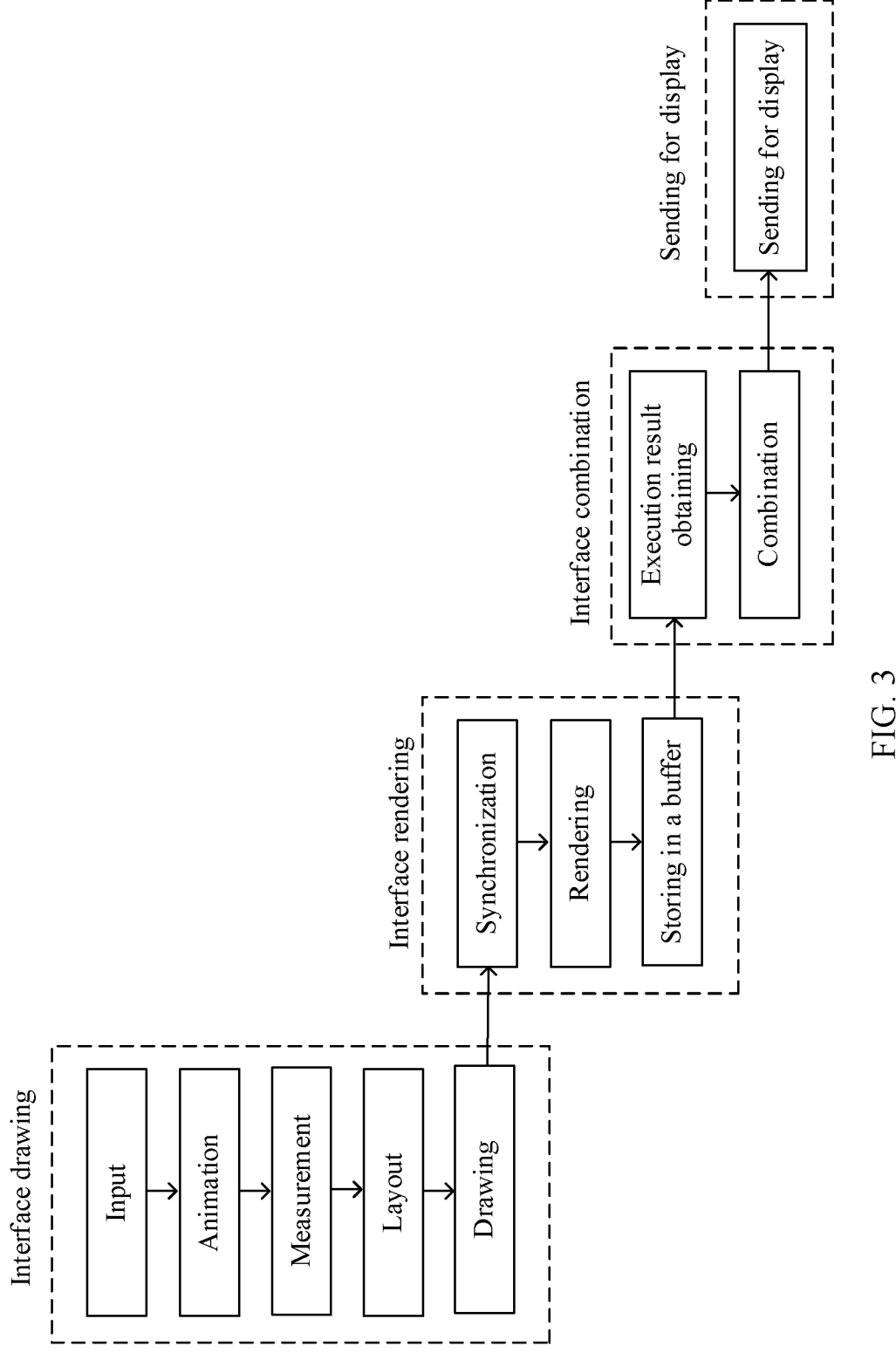
FIG. 3 is an example diagram of a specific interface display process according to an embodiment of this application.

An interface display process of the Android operating system is used as an example. As shown in FIG. 3, an interface is usually displayed through a process of interface drawing, interface rendering, interface combination, and sending for display.

Figure 4:
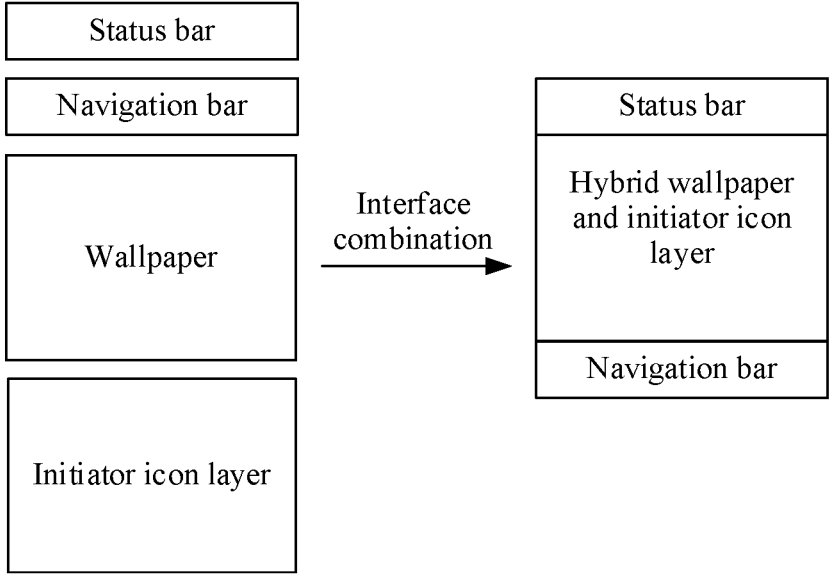
FIG. 4 is an example diagram of a structure of an interface according to an embodiment of this application.

Interface drawing is mainly used to draw an interface layer to be displayed. Interface drawing is essentially pixel filling. A launcher application that is first started after the Android operating system is started and that is used to display an application list, a shortcut, a widget, and the like is used as an example. As shown in FIG. 4, it is assumed that an interface of the launcher application includes four layers: a status bar, a navigation bar, a wallpaper, and an initiator icon layer. Interface drawing is mainly used for drawing of the status bar, the navigation bar, the wallpaper, and the initiator icon layer. For example, drawing of the status bar, the navigation bar, the wallpaper, and the initiator icon layer may be completed by a user interface (user interface, UI) thread. For another example, the status bar and the navigation bar may be drawn by an Android system user interface thread (system user interface thread, systemUI), the wallpaper may be provided by a wallpaper service, and the initiator icon layer may be drawn by the launcher application.

For example, in some embodiments, as shown in FIG. 3, interface drawing may specifically include the following processes:

input, which is used to transfer an input event to a corresponding object for processing;

animation, which is used to calculate a motion location of each frame of animation;

measurement, which is used to obtain and store sizes of each View and ViewGrop based on settings of a control attribute in an XML layout file and code;

layout, which is used to determine a display location of a control based on information obtained through measurement; and drawing, which is used to draw a layer in an application window on a canvas (canvas) and construct a drawing instruction after determining the display location of the control.

Interface rendering is used to adjust, for example, brightness, contrast, and saturation of a drawn layer without changing a status of an original layer. For example, interface rendering may specifically include: A GPU receives, from a CPU, a drawing instruction obtained by the CPU through drawing, performs rasterization processing on a layer, and buffers, into a cache, an image obtained after the rasterization operation. Rasterization is a process of converting a graphic element into a two-dimensional image, where each point on the two-dimensional image contains data such as a color, a depth, and a texture. Further, in some embodiments, after obtaining the drawing instruction through drawing, the CPU may further send the drawing instruction to a graphics and image processing library (for example, an OpenGL for embedded system (OpenGL for Embedded System, OpenGL ES)). The GPU may obtain the drawing instruction from the graphics and image processing library by using a driver interface, and then further perform rasterization processing. As shown in FIG. 3, interface rendering may specifically include the following process: synchronization, which is used to synchronize, from the CPU, the drawing instruction obtained after drawing; rendering, which is used to adjust, for example, brightness, contrast, and saturation of a drawn layer; and storing in a buffer, which is used to store a rendering execution result in the buffer.

Interface combination is mainly used to superimpose and combine a plurality of rendered layers, for example, rendered layer data obtained from the cache, according to a proper overlapping sequence and the like, to obtain a complete image frame. As shown in FIG. 4, the drawn status bar, navigation bar, wallpaper, and initiator icon layer are superimposed and combined according to a proper overlapping sequence, and the like, to obtain a complete image frame. As shown in FIG. 3, combination may specifically include the following process: execution result obtaining, which is used to obtain the rendering execution result stored in the buffer. Interface combination is used to superimpose and combine a plurality of rendered layers according to a proper overlapping sequence and the like, to obtain a complete image frame.

Sending for display refers to invoking a display driver to send, to the display according to a specified display region, a layer obtained through combination.

For example, in the Android operating system, the foregoing interface drawing, interface rendering, interface combination, and sending for display may be triggered by a vertical synchronization (vertical synchronization, VSYNC) signal. The VSYNC signal is a signal sent by the Android operating system (for example, sent at an interval of 16 ms) and used to trigger interface drawing, interface rendering, interface combination, and sending for display. For specific processes and descriptions of interface drawing, interface rendering, interface combination, and sending for display, refer to explanations and descriptions in a conventional technology. Details are not described in this application.

The Android operating system is used as an example. At present, the Android operating system supports two interface combination manners: One is combination by the GPU, and the other is combination by a hardware combiner. However, in the interface display process, interface rendering usually consumes maximum resources (including hardware resources and software resources) and computing power, and a capability of the GPU is limited, especially when interface combination of some interfaces with complex attributes is processed. Therefore, if the GPU continues to be responsible for interface combination, performance is low and power consumption is high.

Based on the foregoing limitation of the GPU and a premise that the hardware combiner has characteristics of high performance and low power consumption when performing interface combination, in an implementation, the GPU may complete the foregoing interface drawing and interface rendering, and the hardware combiner completes the foregoing interface combination and sending for display. However, a conventional hardware combiner does not have a capability to perform interface combination of interfaces with complex attributes.

For advantages and disadvantages of interface combination performed by the GPU and the hardware combiner, refer to the following descriptions in Table 1.

TABLE 1

| Interface combination manner | Performance | Power consumption | Whether a complex attribute is supported | Whether a quantity of layers is limited |
|---|---|---|---|---|
| Hardware combiner | High | Low | Not supported | Yes |
| GPU | Low | High | Supported | No |

For interface combination of the interfaces with the complex attributes, in a processing manner, the hardware combiner usually returns an interface combination task to the GPU.

However, based on the foregoing limitation of the GPU, problems such as high load of the GPU and high power consumption of the electronic device that are caused by low performance and high power consumption in the interface display process still exist. Therefore, based on the method shown in FIG. 3, in the interface display process, problems such as interface jitter and freezing and excessively quick power consumption of the electronic device are likely to occur. This affects user experience.

To resolve the foregoing problem, an embodiment of this application provides an interface display method. In the method, an interface attribute may be monitored to display an interface based on a specific attribute (including a complex attribute and a non-complex attribute) of the interface by using a most appropriate processing procedure.

For example, when it is recognized that the interface includes the complex attribute, a drawing instruction corresponding to the complex attribute is inserted in advance into a drawing instruction obtained through drawing, and the complex attribute is modified to a non-complex attribute, to improve display effect of the interface with the complex attribute, for example, resolve interface jitter or freezing occurring when the interface with the complex attribute is displayed, reduce power consumption, and improve user experience.

The non-complex attribute and the complex attribute are relative concepts. In this embodiment of this application, the complex attribute may include but is not limited to one or more of a rounded corner feature, a transparency feature, a multi-complex icon feature, a multi-window/multi-layer feature, or the like. The non-complex attribute may be understood as an interface attribute other than the complex attribute. For example, the non-complex attribute may be referred to as a simple attribute, a normal attribute, or the like. A specific name of the non-complex attribute relative to the complex attribute is not limited in this application.

In this embodiment of this application, the rounded corner feature means that an interface window is designed to be displayed in a rounded corner style.

The transparency feature may be understood as that the interface window is displayed with specific transparency. For example, the transparency feature means that the interface window is displayed with transparency greater than a first preset transparency threshold (for example, 5% transparency) and less than a second preset transparency threshold (for example, 95% transparency). The first preset transparency threshold and the second preset transparency threshold may be defined by a software developer, and are preset in an electronic device.

The multi-complex icon feature may be understood as that the interface window includes a large quantity of complex icons. For example, the multi-complex icon feature means that the interface window includes complex icons whose quantity is greater than a preset quantity (for example, five). The preset quantity may be defined by the software developer, and is preset in the electronic device. The complex icon means that a quantity of feature elements and the like included in the icon is greater than a preset threshold. The complex icon may be specifically defined by the software developer, and is preset in the electronic device. This is not limited in this application.

The multi-window/multi-layer feature may be understood as that a plurality of interface windows or a plurality of layers are simultaneously displayed on a display of the electronic device.

For example, the multi-window/multi-layer feature means that a quantity of interface windows/layers displayed on the display of the electronic device simultaneously is greater than a preset quantity threshold. For example, when interface windows whose quantity is greater than the preset quantity threshold are displayed on the electronic device in a split-screen manner, the interface attribute includes the multi-window/multi-layer feature.

For another example, the multi-window/multi-layer feature means that the electronic device needs to perform drawing, rendering, combination, and the like on interface windows/layers whose quantity is greater than the preset quantity threshold simultaneously. For example, in a multi-screen collaboration scenario, for example, a case in which a first device extends (for example, projects) one or more interfaces started on the first device to a second device for display, the first device needs to perform drawing, rendering, combination, and the like simultaneously on an interface (for example, a home screen) to be displayed on the first device and one or more interfaces extended to be displayed on the second device. In this case, the interface attribute includes the multi-window/multi-layer feature.

The foregoing preset quantity threshold may be defined by the software developer, and is preset in the electronic device.

Figure 5A:
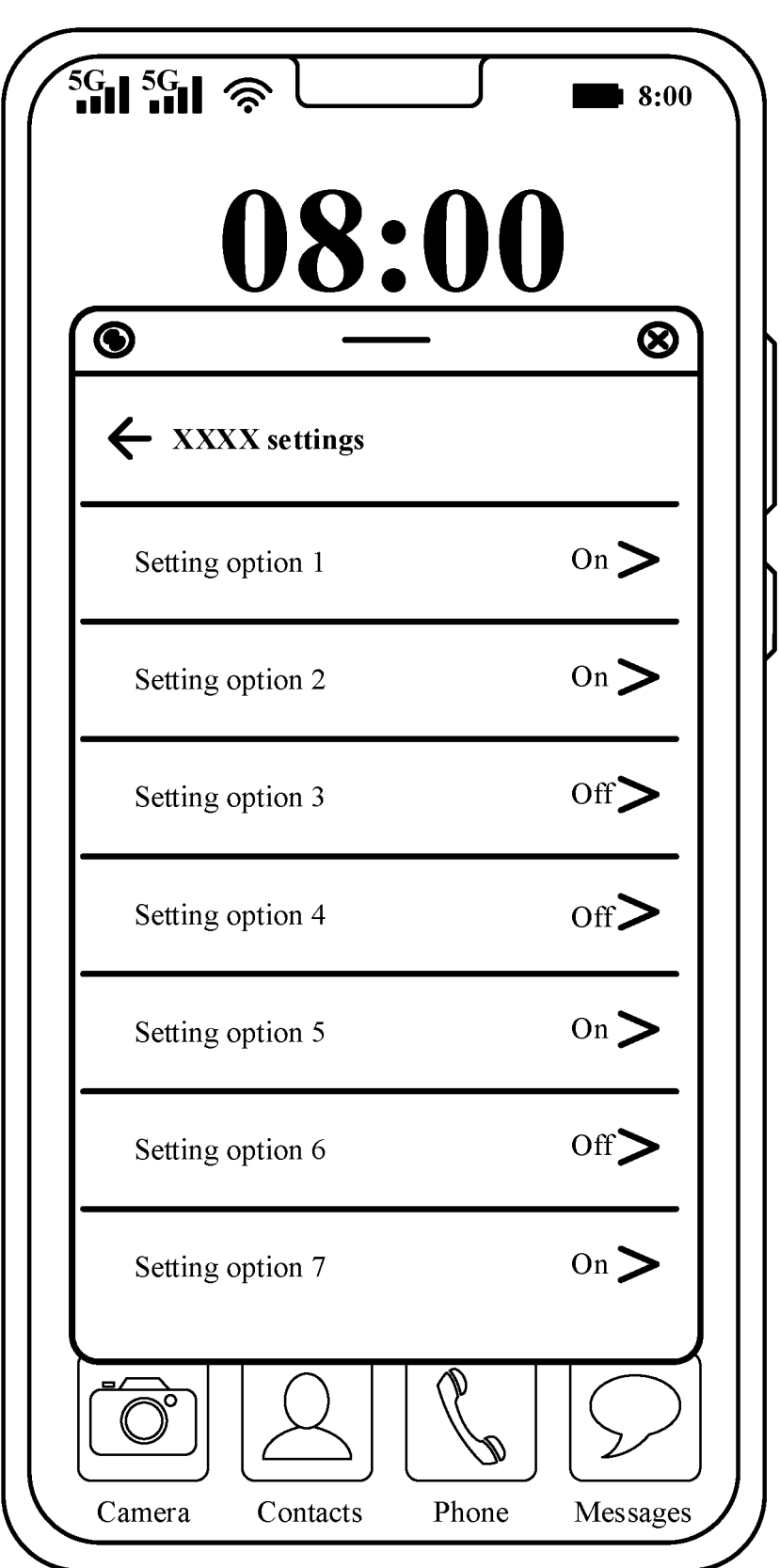
FIG. 5(a) to FIG. 5(c) are example diagrams of three interfaces with complex attributes according to an embodiment of this application.
Figure 5B:
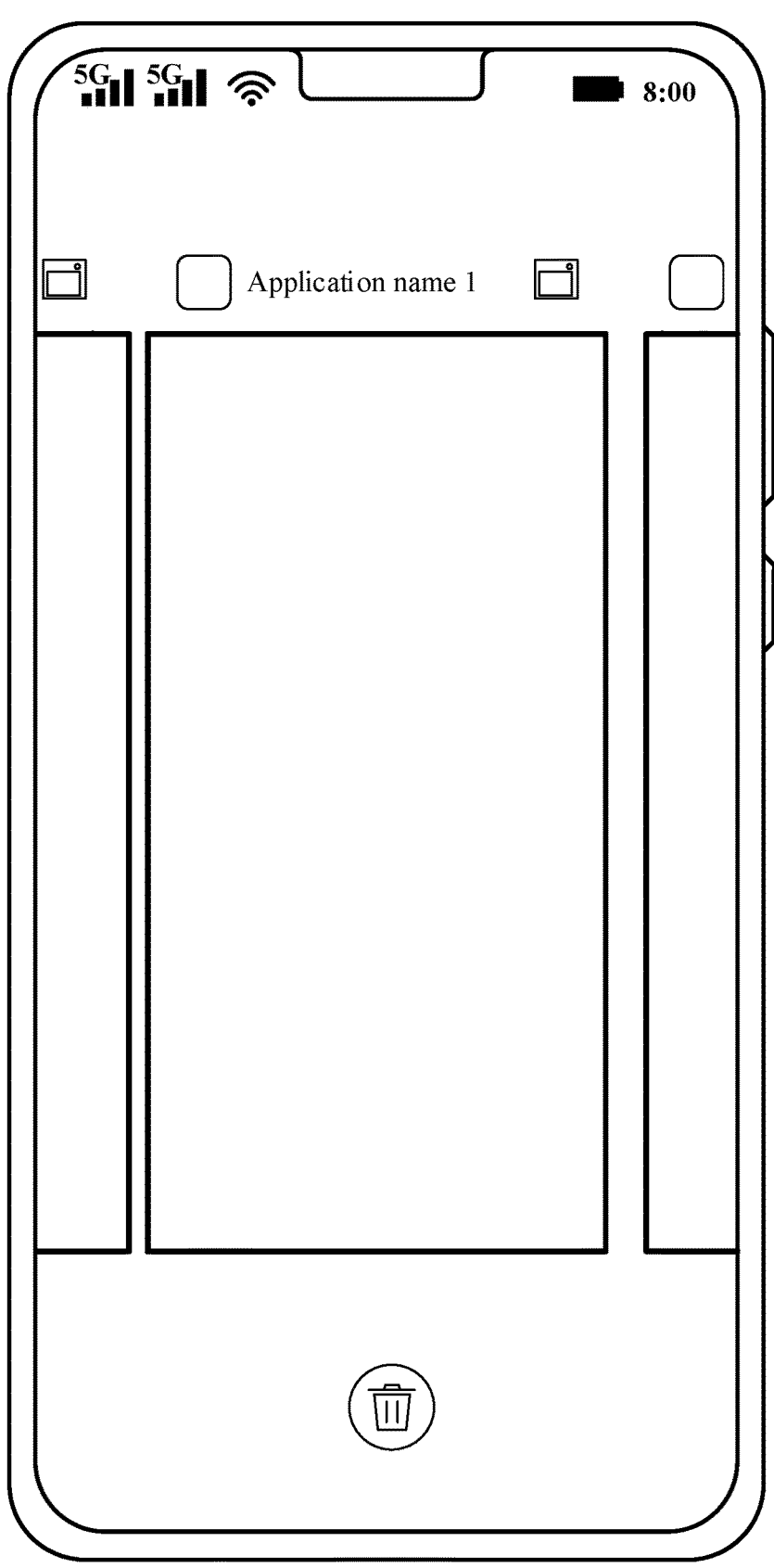
Figure 5C:
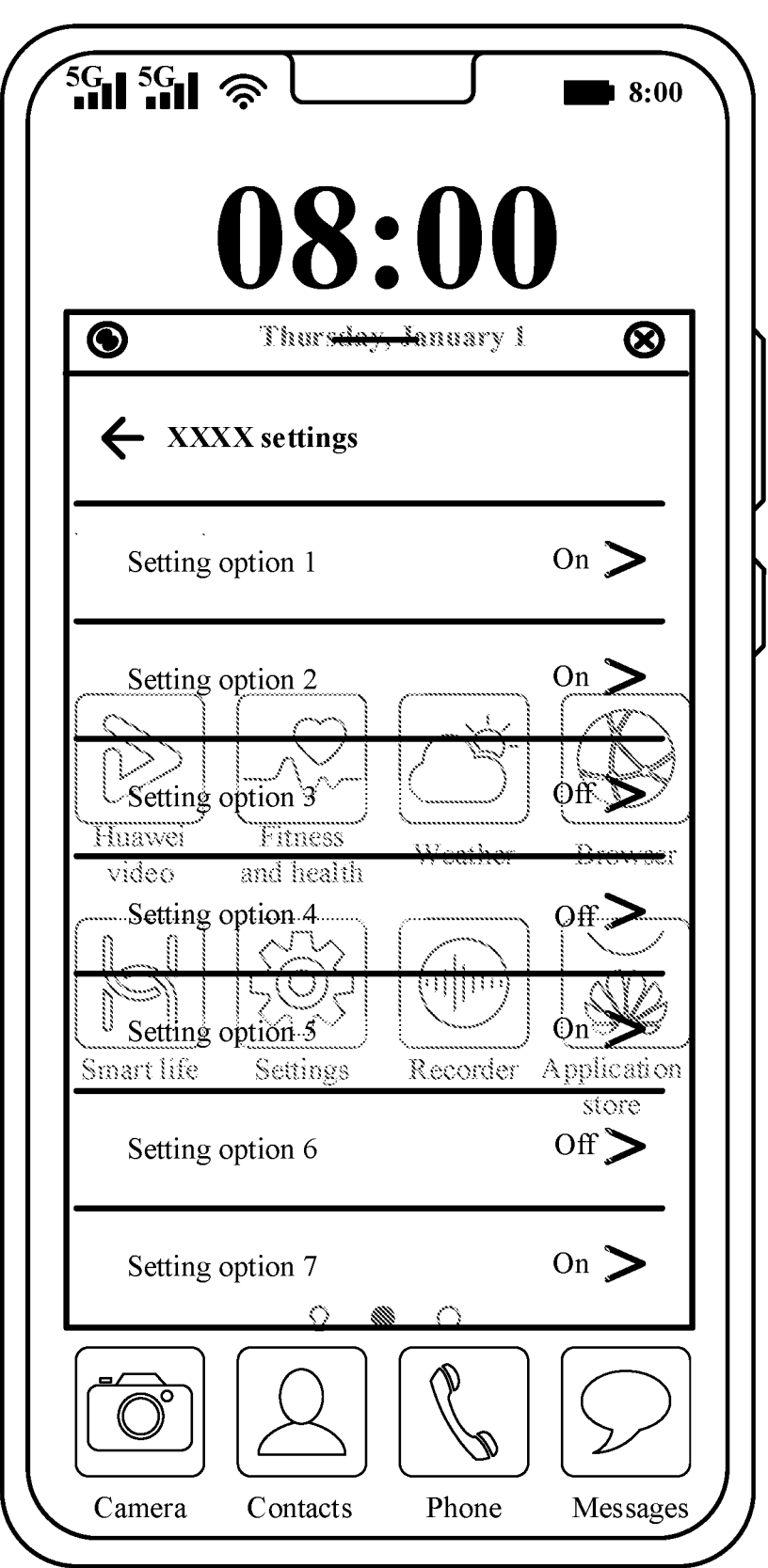

For example, FIG. 5(a) to FIG. 5(c) show examples of three interfaces with complex attributes according to an embodiment of this application. FIG. 5(a) shows an example of an interface with a rounded corner feature, FIG. 5(b) shows an example of an interface with a multi-window/multi-layer feature, and FIG. 5(c) shows an example of an interface with a transparency feature.

It should be noted that, for example, in each of FIG. 5(a), FIG. 5(b), and FIG. 5(c), an example in which the interface has one complex attribute and the complex attribute is one of the rounded corner feature, the multi-window/multi-layer feature, or the transparency feature is used. A type of the complex attribute of the interface is not limited in this embodiment of this application, and a specific quantity of complex attributes of the interface is not limited.

For example, the interface may further have a plurality of complex attributes. For example, an interface shown in FIG. 6(a) has the rounded corner feature and the multi-window/multi-layer feature. For another example, an interface shown in FIG. 6(b) has the rounded corner feature and the transparency feature.

The following describes in detail an interface display method provided in an embodiment of this application with reference to the accompanying drawings.

Figure 7A:
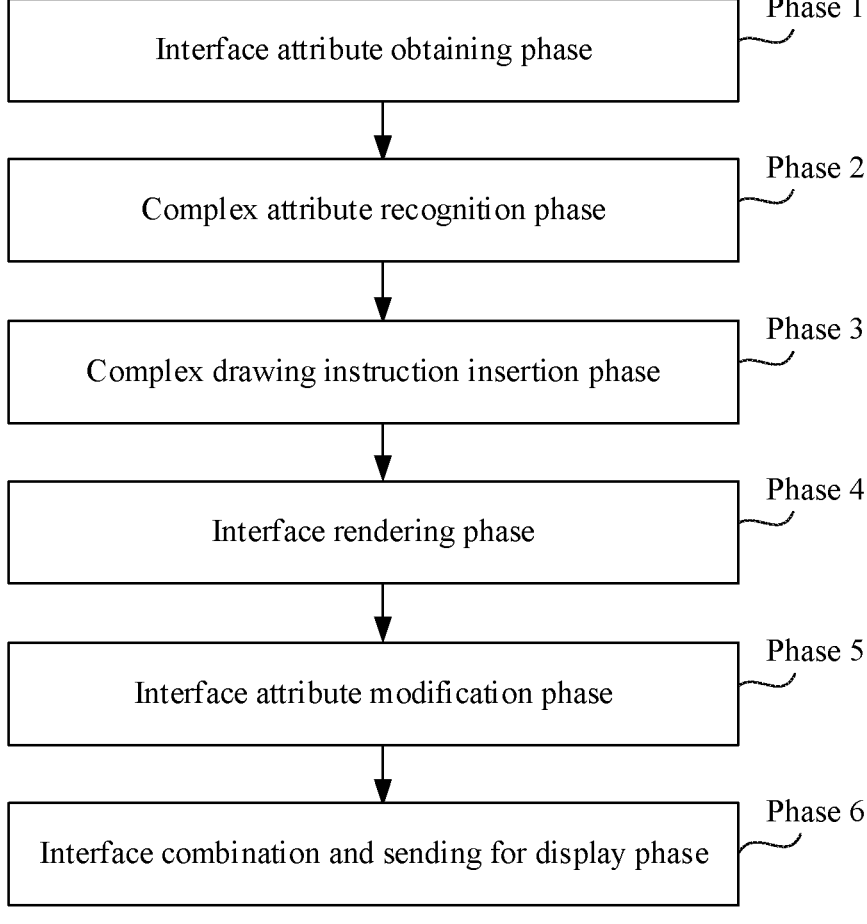
FIG. 7A is a schematic diagram of an interface display process according to an embodiment of this application.

As shown in FIG. 7A, an interface display process provided in this embodiment of this application may include the following six phases.

Phase 1: Interface Attribute Obtaining Phase

The interface attribute obtaining phase (namely, Phase 1) is used to obtain an interface attribute, for example, whether the interface attribute of an interface includes a complex attribute. For example, the complex attribute may include, for example, one or more of the rounded corner feature shown in FIG. 5(a), or the multi-window/multi-layer feature shown in FIG. 5(b), the transparency feature shown in FIG. 5(c).

Phase 2: Complex Attribute Recognition Phase

It may be understood that, as described above, for interface display for an interface with a non-complex attribute, interface drawing, interface rendering, interface combination, and sending for display may be performed by using a conventional interface display method. However, for interface display for an interface with a complex attribute, the conventional interface display method has problems such as interface jitter and freezing and excessively quick power consumption of an electronic device. Therefore, the interface display method provided in this embodiment of this application includes the complex attribute recognition phase (namely, Phase 2). The electronic device may monitor the interface attribute, to perform interface combination based on a specific attribute (including the complex attribute and the non-complex attribute) of the interface by using a most appropriate processing procedure. For example, when determining that the interface has the complex attribute, the electronic device continues to perform steps corresponding to the following Phase 3 to Phase 6.

Phase 3: Complex Drawing Instruction Insertion Phase

In this embodiment of this application, the complex drawing instruction insertion phase (namely, Phase 3) refers to inserting a complex drawing instruction into a normal drawing instruction. The normal drawing instruction is a drawing instruction obtained by the electronic device through interface drawing before interface rendering, that is, before the step corresponding to the foregoing Phase 1 is performed. The complex drawing instruction is used to describe layer information corresponding to the complex attribute on the interface.

It may be understood that a purpose of inserting the complex drawing instruction is to render the complex drawing instruction corresponding to the complex attribute when the electronic device performs interface rendering, to avoid low interface display performance, high power consumption, and the like caused by a case in which a hardware combiner cannot process combination of the interface with the complex attribute subsequently and a GPU re-renders the interface again.

Phase 4: Interface Rendering Phase

For example, the GPU of the electronic device may perform, by using the interface rendering method shown in FIG. 3, interface rendering based on the drawing instruction into which the electronic device inserts the complex drawing instruction in Phase 3. For a specific method and process of interface rendering, refer to the descriptions in a conventional technology. Details are not described herein.

Phase 5: Interface Attribute Modification Phase

The interface attribute modification phase (namely, Phase 5) is used to modify the interface attribute to an attribute that indicates that the interface does not have the complex attribute, for example, modify the complex attribute to a non-complex attribute, for example, a simple attribute or a normal attribute.

It may be understood that, because the hardware combiner has a capability of processing combination of an interface with a non-complex attribute, for example, a simple attribute or a normal attribute, in the method provided in this embodiment of this application, the electronic device modifies the interface attribute to the non-complex attribute by performing the step in the foregoing Phase 5, so that the hardware combiner can normally process combination of the interface. In addition, because in Phase 4, the electronic device has rendered the layer information corresponding to the complex attribute on the interface, final display effect of the interface with the complex attribute is not affected.

After the electronic device modifies the interface attribute to the attribute that indicates that the interface does not have the complex attribute, the hardware combiner may normally perform quick interface combination based on the interface rendered by the GPU.

It should be noted that, in FIG. 7A, an example in which the electronic device first performs the step corresponding to the interface rendering phase (namely, Phase 4), and then performs the step corresponding to the interface attribute modification phase (namely, Phase 5) is used. However, a specific execution sequence of the steps corresponding to Phase 4 and Phase 5 is not limited in this embodiment of this application. For example, alternatively, the electronic device may first perform the step corresponding to the interface attribute modification phase (namely, Phase 5) first, and then perform the step corresponding to the interface rendering phase (namely, Phase 4). For another example, the electronic device may further perform the step corresponding to the interface rendering phase (namely, Phase 4) and the step corresponding to the interface attribute modification phase (namely, Phase 5) simultaneously.

Phase 6: Interface Combination and Sending for Display Phase

In this embodiment of this application, the interface combination and sending for display phase (namely, Phase 6) is performed by the hardware combiner. For a specific method and process in which the hardware combiner performs interface rendering, combination, and sending for display, refer to descriptions in the conventional technology. Details are not described herein.

Figure 7B:
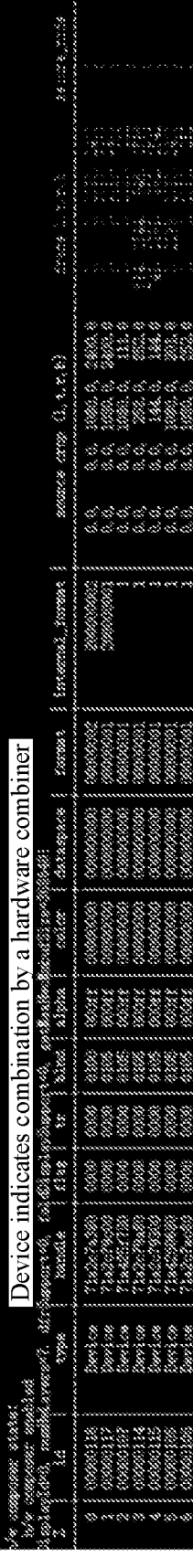
FIG. 7B is an example diagram of interface combination layer information according to an embodiment of this application.
Figure 7C:
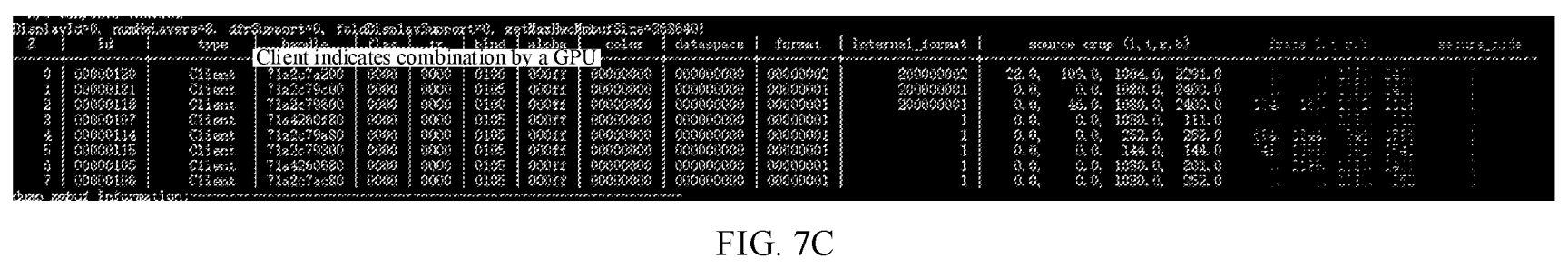

FIG. 7B is an example diagram of interface combination layer information according to an embodiment of this application. For example, the interface combination layer information shown in FIG. 7B may be obtained by executing a command, for example, dumpsys SurfaceFlinger. As shown in FIG. 7B, type indicates an interface combination manner, including hardware combiner combination, GPU combination, or the like. If type is Device shown in FIG. 7B, it indicates that combination is performed by the hardware combiner. Correspondingly, if interface combination is performed by the GPU, obtained interface combination layer information may be shown in FIG. 7C. If type is Client shown in FIG. 7C, it indicates that interface combination is performed by the GPU.

Figure 8:
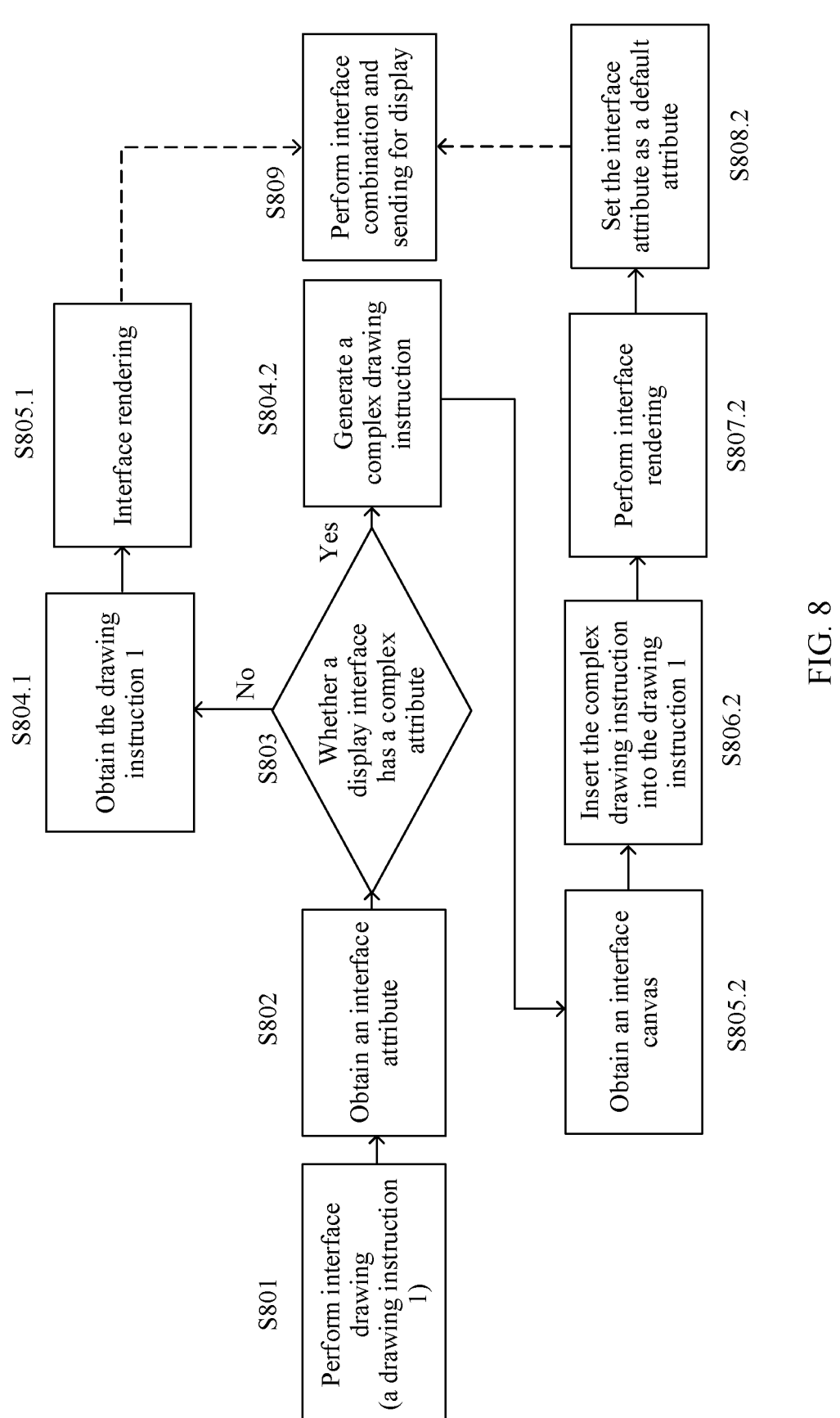
FIG. 8 is a flowchart of an interface display method according to an embodiment of this application.

For ease of understanding, FIG. 8 is a detailed flowchart of an interface display method according to an embodiment of this application. The interface attribute obtaining phase (namely, Phase 1) may specifically include step S802 shown in FIG. 8, the complex attribute recognition phase (namely, Phase 2) may specifically include step S803 shown in FIG. 8, the complex drawing instruction insertion phase (namely, Phase 3) may specifically include steps S804.2, S805.2, and S806.2 shown in FIG. 8, the interface rendering phase (namely, Phase 4) may specifically include step S807.2 shown in FIG. 8, the interface attribute modification phase (namely, Phase 5) may specifically include step S808.2 shown in FIG. 8, and the interface combination and sending for display phase (namely, Phase 6) may specifically include step S809 shown in FIG. 8.

An execution body shown in FIG. 8 is an electronic device (to simplify FIG. 8, the execution body is not shown in FIG. 8). As shown in FIG. 8, the interface display method provided in this embodiment of this application may include the following steps S801 to S803.

S801: The electronic device performs interface drawing.

For example, a CPU of the electronic device may perform interface drawing by using the interface drawing method shown in FIG. 3, draw, on a canvas (canvas), layers corresponding to non-complex attributes in all application windows included in an interface, and construct a drawing instruction 1 (namely, a first drawing instruction). The drawing instruction 1 is used to describe layer information corresponding to a non-complex attribute of a display interface (for example, a first interface). For a specific method and process of interface drawing, refer to descriptions in a conventional technology. Details are not described herein.

Figure 6A:
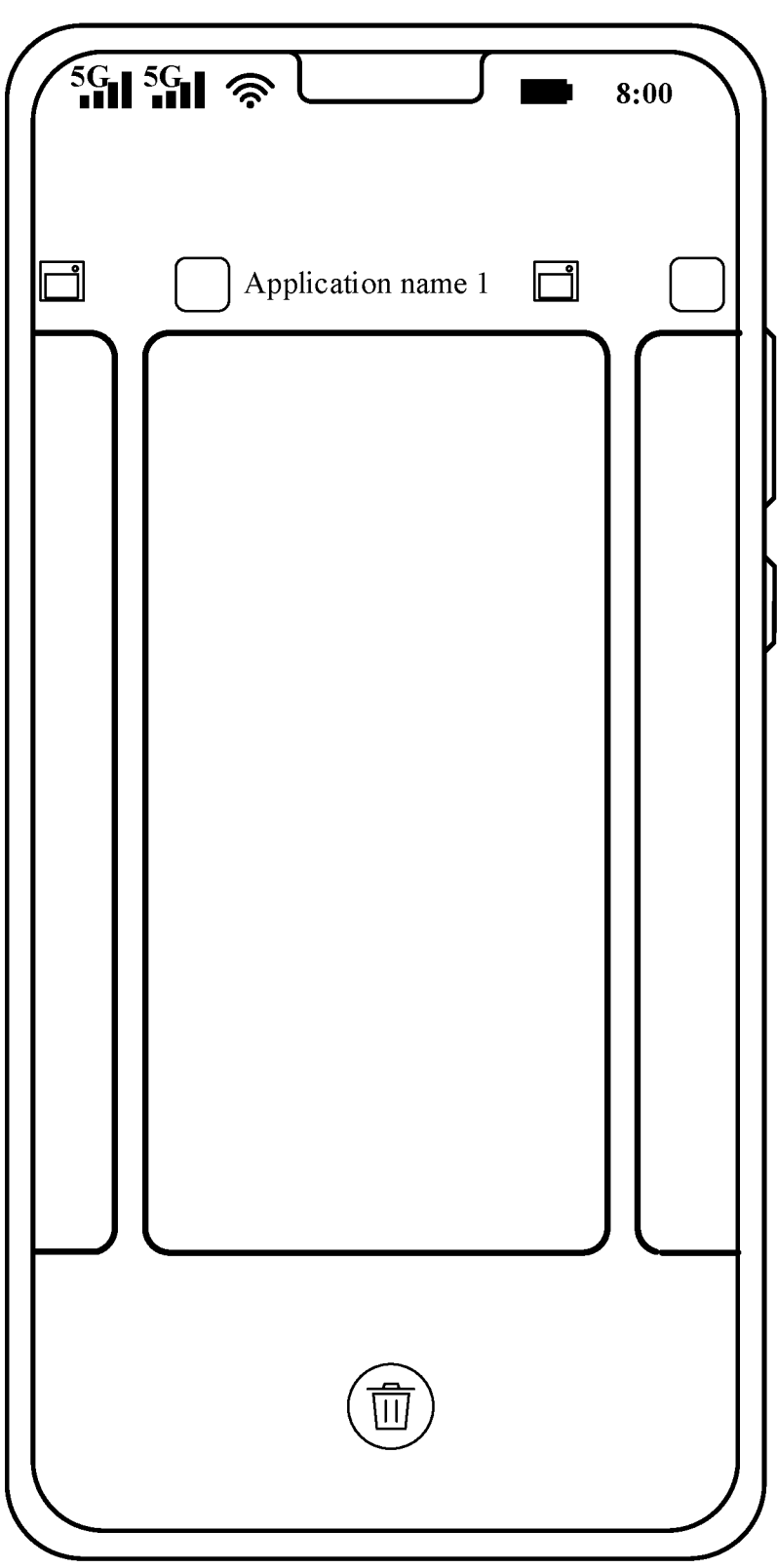
FIG. 6(a) and FIG. 6(b) are example diagrams of two interfaces with complex attributes according to an embodiment of this application.
Figure 6B:
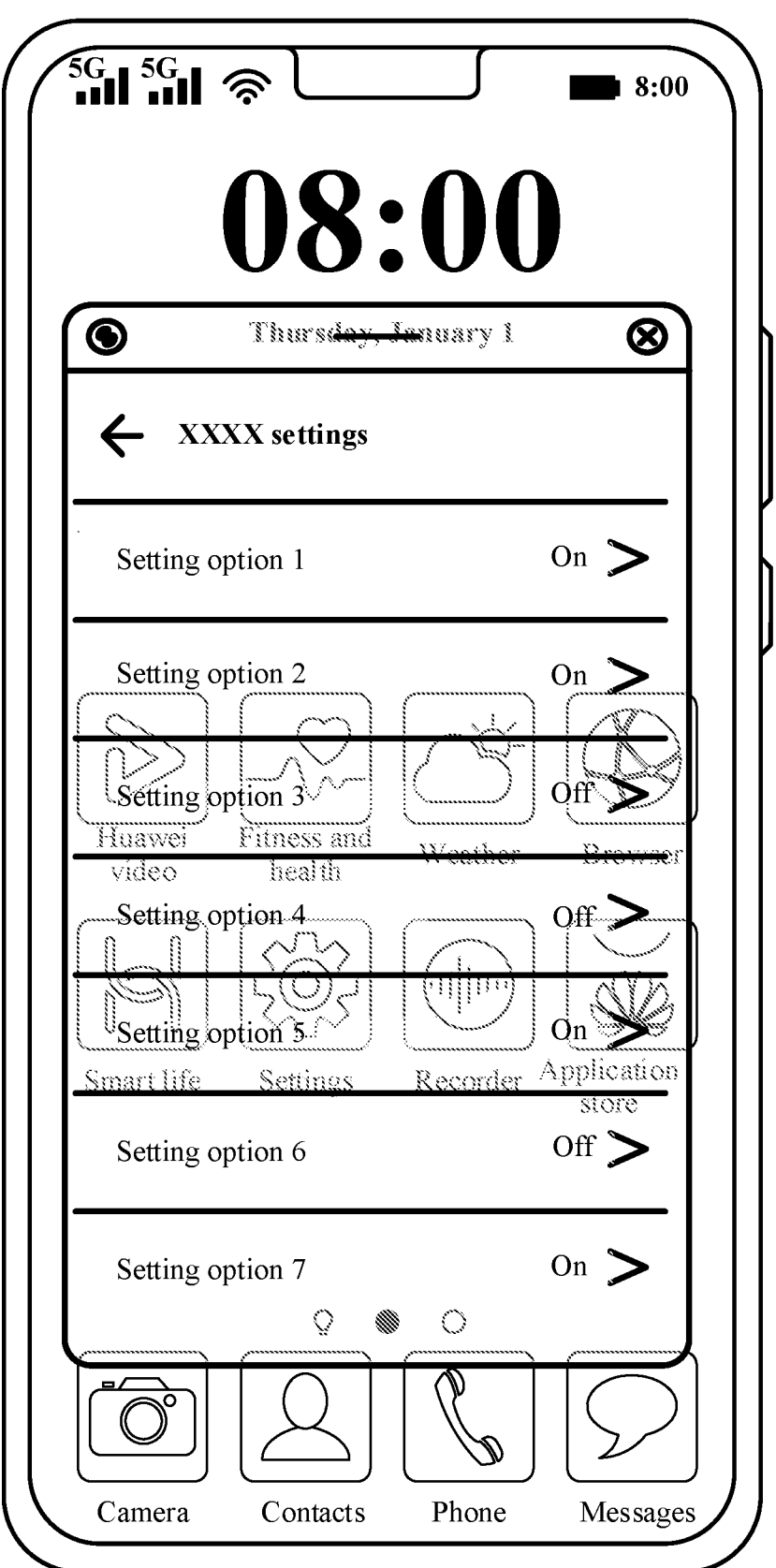

It should be noted that, in some cases, if the interface includes a plurality of application windows, for example, the interface with the multi-window/multi-layer feature shown in FIG. 5(b) and the interface with the multi-window/multi-layer feature shown in FIG. 6(a), the electronic device draws all of a plurality of display interfaces to obtain drawing instructions corresponding to the plurality of display interfaces.

For example, the interface includes four application windows (such as an application window 1, an application window 2, an application window 3, and an application window 4). The electronic device separately draws display interfaces in the plurality of application windows to obtain a drawing instruction 11 corresponding to a display interface in the application window 1, a drawing instruction 12 corresponding to a display interface in the application window 2, a drawing instruction 13 corresponding to a display interface in the application window 3, and a drawing instruction 14 corresponding to a display interface of the application window 4.

S802: The electronic device obtains an interface attribute.

The interface attribute includes a complex attribute and a non-complex attribute. For example, the complex attribute may include but is not limited to one or more of a rounded corner feature, a transparency feature, a multi-complex icon feature, a multi-window/multi-layer feature, or the like. The non-complex attribute may include an interface attribute other than the complex attribute.

For example, in this embodiment of this application, the CPU of the electronic device may obtain an interface attribute of the display interface (for example, the first interface) by monitoring interface information. For example, the electronic device may obtain the interface attribute of the display interface (for example, the first interface) by monitoring the interface information at an interface rendering front end.

Figures 9A, 9B:
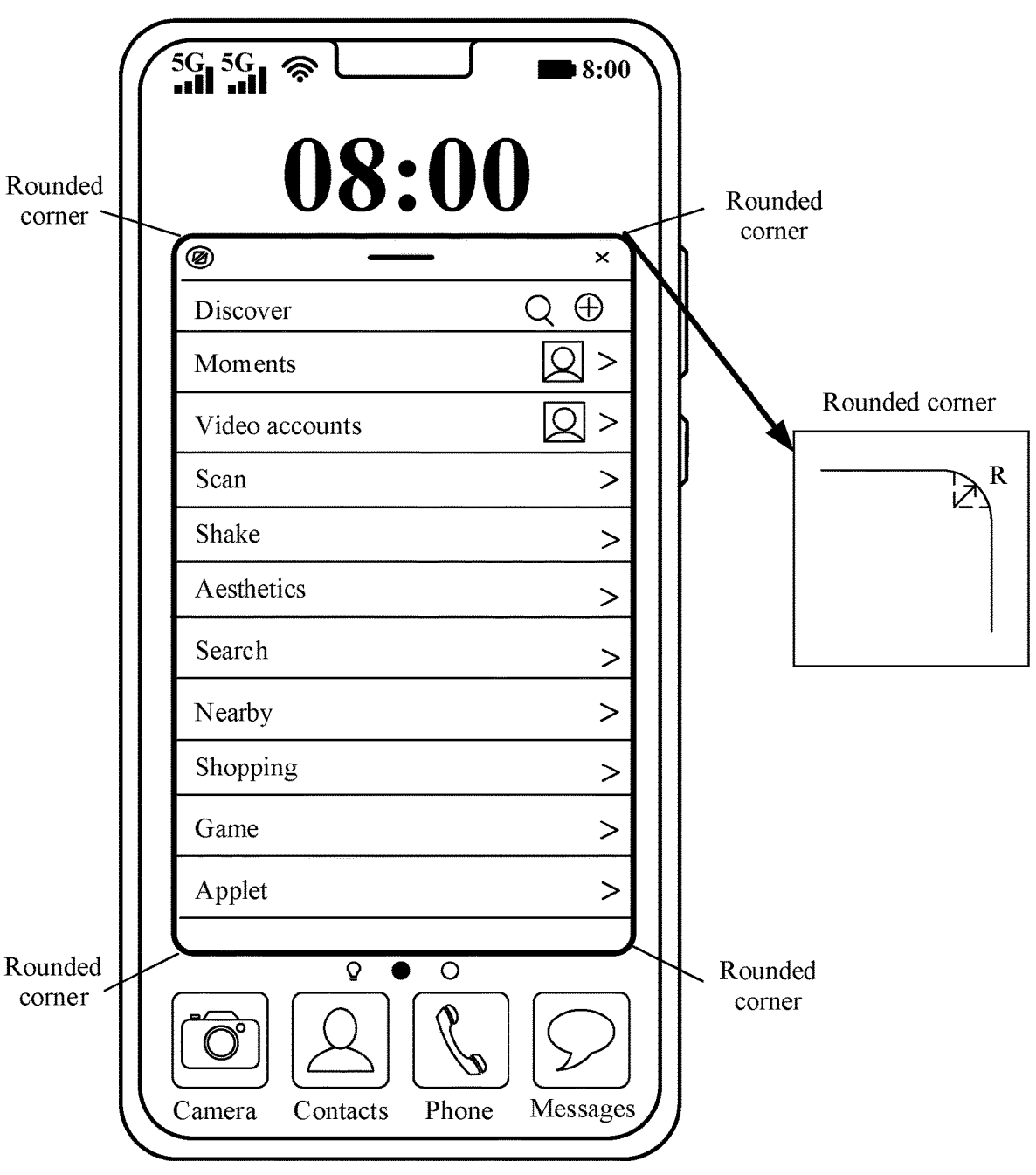
FIG. 9A is an example diagram of an interface with a rounded corner feature according to an embodiment of this application.
FIG. 9B is an example diagram of code corresponding to interface information according to an embodiment of this application.

For example, the electronic device displays a WeChat® application window in response to an operation of starting a WeChat® application by a user. As shown in FIG. 9A, a WeChat® interface has the rounded corner feature. Specifically, all four corners of the WeChat® application window are presented with rounded corners of a same radius.

FIG. 9B is an example diagram of interface information according to an embodiment of this application by using the WeChat® interface with the rounded corner feature shown in FIG. 9A as an example. As shown in FIG. 9B, code corresponding to WeChat® interface information includes cornerRadius, which indicates that the WeChat® interface has the rounded corner feature. Herein, cornerRadius=222.482712 indicates a rounded corner value of the rounded corner of the WeChat® window, where the rounded corner value is a rounded corner radius (for example, R shown in FIG. 9A). Coordinate information [363, 766, 1043, 1815] indicates that coordinate locations of the rounded corners in a preset coordinate system range from (363, 766) to (1043, 1815).

The preset coordinate system may be a preset coordinate system of the electronic device, a world coordinate system, a ground coordinate system, or the like. This is not limited in this application. For example, the preset coordinate system of the electronic device may be a two-dimensional coordinate system corresponding to a touchscreen of the electronic device. For example, the electronic device is a smartphone. The two-dimensional coordinate system may be a coordinate system formed by using a lower left corner of the smartphone as a coordinate origin O, a short side on a lower side of the smartphone as an x-axis, and a long side on a left side of the smartphone as a y-axis when a touchscreen of the smartphone faces the user in a portrait state.

S803: The electronic device determines whether the display interface has a complex attribute.

For example, the CPU of the electronic device may further determine, by analyzing the obtained interface attribute of the display interface (for example, the first interface), whether the display interface (for example, the first interface) has the complex attribute.

According to the interface display method provided in this embodiment of this application, interface display may be performed based on a specific attribute of the display interface (for example, the first interface) by using a most appropriate processing procedure.

For example, in some embodiments, if the electronic device recognizes that the interface attribute of the display interface includes the complex attribute, that is, the display interface has the complex attribute, the electronic device performs the following steps S804.2 to S808.2 and S809.

S804.2: The electronic device generates a complex drawing instruction.

For example, the CPU of the electronic device may generate the complex drawing instruction based on the obtained complex attribute of the display interface (for example, the first interface).

The complex drawing instruction is used to describe layer information corresponding to the complex attribute of the display interface (for example, the first interface).

For example, when the complex attribute is the rounded corner feature shown in FIG. 5(a), the complex drawing instruction is a drawing instruction corresponding to the rounded corner feature. For example, the drawing instruction corresponding to the rounded corner feature may be used to describe coordinate information of a rounded corner, a radius of the rounded corner, and the like.

For another example, when the complex attribute is the multi-window/multi-layer feature shown in FIG. 5(b), the complex drawing instruction is a drawing instruction corresponding to the multi-window/multi-layer feature. For example, the drawing instruction corresponding to the multi-window/multi-layer feature may be used to describe coordinate information of a window, a display style of the window, and the like.

For another example, when the complex attribute is the transparency feature shown in FIG. 5(c), the complex drawing instruction is a drawing instruction corresponding to the transparency feature. For example, the drawing instruction corresponding to the transparency feature may be used to describe coordinate information, transparency information, and the like of a transparency region.

For another example, when the complex attribute is the multi-complex icon feature, the complex drawing instruction is a drawing instruction corresponding to the multi-complex icon feature. For example, the drawing instruction corresponding to the multi-complex icon feature may be used to describe coordinate information and icon configuration information of a complex icon. The icon configuration information may include but is not limited to an element, for example, a text, a color, and a graph in the icon, location information of the element, and the like.

For example, in an Android operating system, the transparency information may be indicated by alpha. For example, alpha=#AB, where A indicates transparency and B represents a color. A may be any value ranging from 00 to ff, where FF indicates that the transparency is 100% (that is, opaque), and 00 indicates that the transparency is 0% (that is, completely transparent). B may be any value ranging from 000000 to ffffff, where 000000 indicates black, and ffffff indicates white. For specific indication manners of alpha and other transparency information, refer to descriptions in the conventional technology. Details are not described herein.

For another example, when the complex attribute is the multi-complex icon feature, the complex drawing instruction is a drawing instruction corresponding to the multi-complex icon feature. For example, the drawing instruction corresponding to the multi-complex icon feature may be used to describe coordinate information of a complex icon, a display style of the complex icon, and the like.

The WeChat® interface with the rounded corner feature shown in FIG. 9A is used as an example. The drawing instruction corresponding to the rounded corner feature generated by the electronic device may be (ClipRRect 363, 766, 1043, 1815, 222.48). The drawing instruction corresponding to the rounded corner feature indicates to clip, in the preset coordinate system, a rounded corner rectangle whose rounded corner value (namely, a rounded corner radius) is 222.48 from a location region from (363, 766) to (1043, 1815). Herein, 222.48 indicates the rounded corner value (namely, the rounded corner radius R) of the rounded corner of the WeChat® window.

S805.2: The electronic device obtains an interface canvas.

In this embodiment of this application, the interface canvas is a root-layer canvas of the display interface (for example, the first interface). A layer corresponding to the drawing instruction 1 (namely, the first drawing instruction) is drawn on the interface canvas.

In some embodiments, the electronic device (more specifically, for example, the CPU of the electronic device) may directly extract the interface canvas of the display interface (for example, the first interface) from the drawing instruction.

In some other embodiments, the electronic device cannot directly extract the interface canvas of the display interface (for example, the first interface) from the drawing instruction. For example, for some application windows for video playing, it is difficult for the electronic device to directly extract a canvas from a drawing instruction. In this case, that the electronic device obtains a canvas may specifically include: The electronic device (more specifically, for example, the CPU of the electronic device) obtains the interface canvas of the display interface (for example, the first interface) by drawing the drawing instruction 1 on a newly created canvas.

S806.2: The electronic device inserts the complex drawing instruction into the drawing instruction 1.

In the flowchart shown in FIG. 8, the complex drawing instruction insertion phase (namely, Phase 4) refers to inserting the complex drawing instruction into the drawing instruction 1 (namely, the first drawing instruction), to obtain a second drawing instruction. The drawing instruction 1 is a drawing instruction 1 constructed by the electronic device by performing interface drawing in step S801.

For example, the CPU of the electronic device may insert, into the obtained interface canvas, a layer corresponding to the complex drawing instruction. Further, the CPU of the electronic device may obtain the layer information on the interface canvas, to obtain the second drawing instruction.

FIG. 10 is an example diagram of inserting the complex drawing instruction into the drawing instruction 1 by using the WeChat® interface with the rounded corner feature shown in FIG. 9A as an example. For another example, an interface having the transparency feature is used as an example. The CPU of the electronic device may insert, in the drawing instruction 1, an attribute of Paint and coordinate information corresponding to the attribute, to insert coordinate information, transparency information, and the like that correspond to the transparency feature and that are of a transparency region.

S807.2: The electronic device performs interface rendering.

For example, a GPU of the electronic device may perform, by using the interface rendering method shown in FIG. 3, interface rendering on the display interface (namely, the first interface) based on the drawing instruction (namely, the second drawing instruction) into which the complex drawing instruction is inserted by the electronic device in step S806.2.

S808.2: The electronic device sets the interface attribute to a default attribute.

In this embodiment of this application, the default attribute is an interface attribute that can be processed by a hardware combiner of the electronic device. For example, the default attribute may be a non-complex attribute, for example, a simple attribute or a normal attribute. For example, the electronic device may modify the complex attribute in the interface attribute of the display interface (for example, the first interface) to a non-complex attribute.

For example, the CPU of the electronic device may modify the interface attribute in the interface information of the display interface (for example, the first interface), to set the interface attribute of the display interface (for example, the first interface) to a default attribute. The WeChat® interface with the rounded corner feature shown in FIG. 9A is used as an example. For example, the CPU of the electronic device may set cornerRadius in the interface information to 0, to set the interface attribute to a non-round corner feature. For another example, the interface with the transparency feature is used as an example. The CPU of the electronic device may modify information (for example, an alpha value) that is in the interface information and that indicates the window transparency to opaque. For example, the CPU of the electronic device may modify a value of fColor4f.fA corresponding to an interface View with the transparency feature to a parameter indicating opaque, as shown in the following language:

```
void SkPiant::setAlphaf(float a){
    SkASSERT(a>=o&&a<=1.of);
    fColor4f.fA=the parameter indicating opaque;
}.
```

It should be noted that, in FIG. 8, an example in which the electronic device first performs step S807.2, and then performs step S808.2 is used as an example. However, a specific execution sequence of step S807.2 and step S808.2 is not limited in this embodiment of this application. For example, alternatively, the electronic device may first perform step S808.2, and then perform step S807.2. For another example, the electronic device may simultaneously perform steps S807.2 and S808.2.

S809: The electronic device performs interface combination and sending for display.

For example, after step S808.2 is performed, the electronic device may perform interface combination based on an execution result obtained after step S807.2 is performed. For example, the electronic device may perform interface combination on the execution result obtained after step S807.2 is performed and a rendering result of a second interface.

In some embodiments, if the second interface has the complex attribute, the rendering result of the second interface may be obtained by using a method similar to the foregoing step S801 to step S803 and step S804.2 to step S807.2.

For example, the second interface may include one or more of the following: a home screen of the electronic device, a second application interface, a floating window interface, or a status bar of the electronic device.

Further, optionally, the electronic device may send the display interface (for example, the first interface) for display.

Alternatively, in some scenarios, for example, a screen projection scenario, further optionally, the electronic device may project the display interface (for example, the first interface) onto another device.

For example, the electronic device sends a configuration parameter of the first interface to the another device, to project the first interface onto the another device. The configuration parameter of the first interface may include but is not limited to location information of an element, for example, a text, a widget, or a graphic on the first interface, specific information of the element, and the like.

Interface combination in step S809 may be performed by the hardware combiner. Sending for display in step S809 may be performed by the hardware combiner, or may be performed by a processor or another module. This is not limited in this application.

It can be understood that, after the electronic device sets the interface attribute to the default attribute, an advantage of the hardware combiner can be maximized, and interface combination with high performance and low power consumption can be normally performed based on an interface rendered by the GPU.

For another example, in some other embodiments, if the electronic device identifies that the interface attribute of the display interface (for example, the first interface) does not include the complex attribute, that is, the display interface (for example, the first interface) does not have the complex attribute, the electronic device continues to perform the following step S804.1, step S805.1, and step S809.

S804.1: The electronic device obtains the drawing instruction 1.

In the flowchart shown in FIG. 8, the drawing instruction 1 is a drawing instruction (namely, the first drawing instruction) constructed by the electronic device when the electronic device performs interface drawing in step S801.

S805.1: The electronic device performs interface rendering.

For example, a GPU of the electronic device may perform, by using the interface rendering method shown in FIG. 3, interface rendering on the display interface (for example, the first interface) based on the drawing instruction 1 obtained by the electronic device in step S804.1.

S809: The electronic device performs interface combination and sending for display.

For example, after step S805.1 is performed, the electronic device may perform interface combination based on an execution result obtained after step S805.1 is performed. For example, the electronic device may perform interface combination on an execution result obtained after step S807.2 is performed and a rendering result of a second interface.

In some embodiments, if the second interface has the complex attribute, the rendering result of the second interface may be obtained by using a method similar to the foregoing step S801 to step S803 and step S804.2 to step S807.2.

For example, the second interface may include one or more of the following: a home screen of the electronic device, a second application interface, a floating window interface, or a status bar of the electronic device.

In some scenarios, for example, in a screen projection scenario, optionally, after the electronic device performs interface combination, the electronic device may further project the display interface (for example, the first interface) to another device.

For example, the electronic device sends a configuration parameter of the first interface to the another device, to project the first interface onto the another device. The configuration parameter of the first interface may include but is not limited to location information of an element, for example, a text, a widget, or a graphic on the first interface, specific information of the element, and the like.

Interface combination in step S809 may be performed by the hardware combiner.

It may be understood that, when the interface attribute is a non-complex attribute, when the hardware combiner performs interface combination, there is no case in which processing cannot be performed. In this way, an advantage of the hardware combiner can be maximized, and interface combination with high performance and low power consumption can be normally performed based on an interface rendered by the GPU.

According to the interface display method provided in this embodiment of this application, the electronic device may monitor the interface attribute, to display the interface based on the specific attribute (including the complex attribute and the non-complex attribute) of the interface by using the most appropriate processing procedure. For example, when it is recognized that the interface does not include the complex attribute, the hardware combiner performs interface combination by using a conventional processing procedure. When it is recognized that the interface includes the complex attribute, a drawing instruction corresponding to the complex attribute is inserted, in advance into a drawing instruction obtained through drawing, and the interface attribute is modified to a non-complex attribute, so that the hardware combiner can successfully perform subsequent interface combination. The method can improve display effect of the interface with the complex attribute, for example, resolve interface jitter or freezing occurring when the interface with the complex attribute is displayed, and can reduce power consumption and improve user experience.

It should be understood that the solutions in embodiments of this application may be properly combined for use, and explanations or descriptions of terms in embodiments may be cross-referenced or explained in embodiments. This is not limited.

It should be further understood that sequence numbers of the foregoing processes do not mean execution sequences in embodiments of this application. The execution sequences of the processes should be determined based on functions and internal logic of the processes, and should not be construed as any limitation on the implementation processes of embodiments of this application.

It may be understood that, to implement functions of any one of the foregoing embodiments, the electronic device includes a corresponding hardware structure and/or software module for performing each function. A person skilled in the art should easily be aware that, in combination with units and algorithm steps of the examples described in embodiments disclosed in this specification, this application may be implemented by hardware or a combination of hardware and computer software. Whether a function is implemented by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the electronic device may be divided into functional modules. For example, each functional module corresponding to each function may be obtained through division, or two or more functions may be integrated into one processing module. The foregoing integrated module may be implemented in a form of hardware, or may be implemented in a form of a software function module. It should be noted that, in embodiments of this application, module division is an example, and is merely a logical function division. During actual implementation, another division manner may be used.

For example, when each functional module of an electronic device is obtained through division in an integrated manner, FIG. 11 is a block diagram of a structure of an electronic device according to an embodiment of this application. As shown in FIG. 11, the electronic device may include a first processing unit 1110, a second processing unit 1120, a hardware combiner 1130, and a display unit 1140.

The first processing unit 1110 is configured to: support the electronic device in obtaining a first drawing instruction obtained by drawing a first interface; determine whether the first interface has a complex attribute; when it is recognized that an interface attribute of the first interface includes the complex attribute, obtain a complex drawing instruction corresponding to the complex attribute; insert the complex drawing instruction into the first drawing instruction to obtain a second drawing instruction; and/or perform another process for the techniques described in this specification. The second processing unit 1120 is configured to: support the electronic device in rendering the first interface based on a second drawing instruction; set the interface attribute of the first interface to a non-complex attribute; and/or perform another process for the techniques described in this specification. The hardware combiner 1130 is configured to: support the electronic device in combining the first interface and a second interface; and/or perform another process for the techniques described in this specification.

Optionally, in some embodiments, the display unit 1140 is configured to display the first interface.

It should be noted that, in some embodiments, setting the interface attribute of the first interface to the non-complex attribute may be completed by the first processing unit 1110.

Figure 12:
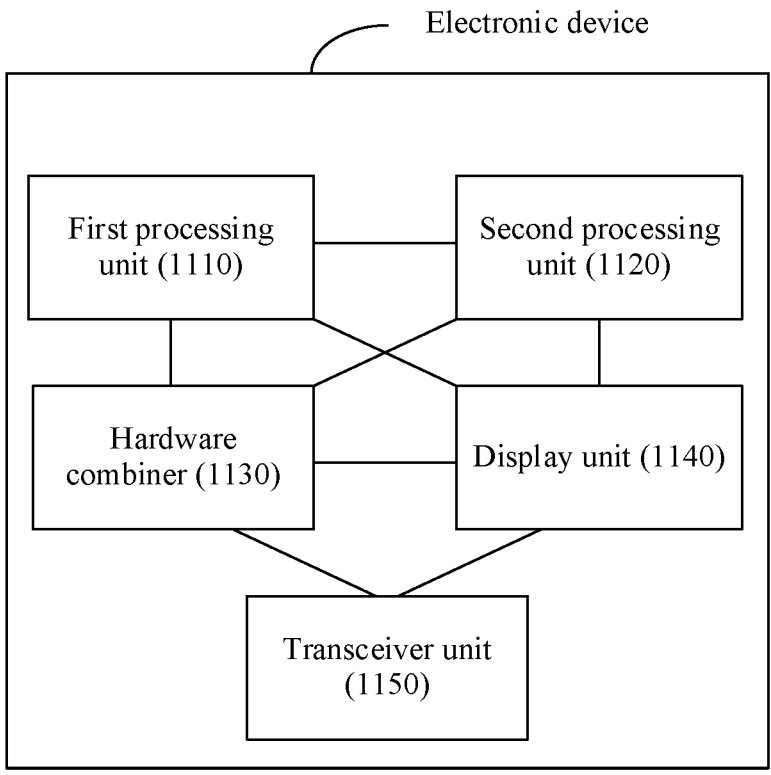
FIG. 12 is a schematic diagram of another structure of an electronic device according to an embodiment of this application.

Optionally, in some other embodiments, as shown in FIG. 12, the electronic device may further include a transceiver unit 1150, configured to send a configuration parameter of the first interface to another device, to project the first interface onto the another device.

It should be noted that the transceiver unit 1150 may include a radio frequency circuit. Specifically, the electronic device may receive and send radio signals through the radio frequency circuit. The radio frequency circuit usually includes but is not limited to an antenna, at least one amplifier, a transceiver, a coupler, a low noise amplifier, a duplexer, and the like. In addition, the radio frequency circuit may further communicate with another device through wireless communication. The wireless communication may use any communication standard or protocol, including but not limited to a global system for mobile communications, a general packet radio service, code division multiple access, wideband code division multiple access, long term evolution, an email, a short message service, and the like.

Figure 13:
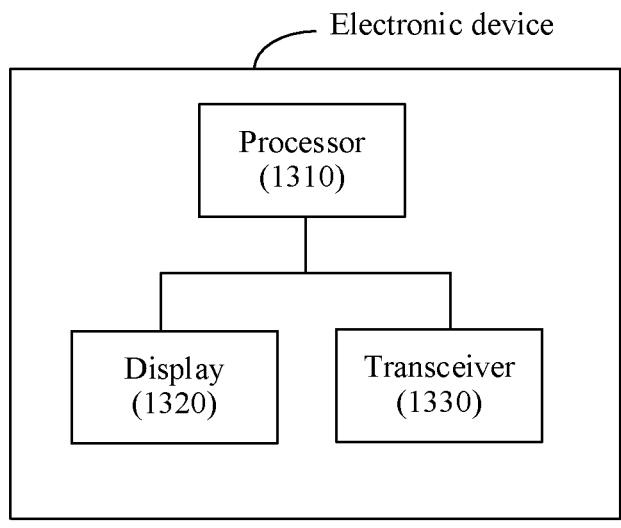
FIG. 13 is a schematic diagram of a structure of an electronic device according to an embodiment of this application.

It should be understood that each module in the electronic device may be implemented in a form of software and/or hardware. This is not specifically limited herein. In other words, the electronic device is presented in a form of a functional module. The "module" herein may be an application-specific integrated circuit ASIC, a circuit, a processor that executes one or more software or firmware programs and a memory, an integrated logic circuit, and/or another component that can provide the foregoing functions. Optionally, in a simple embodiment, a person skilled in the art may realize that the electronic device may be in a form shown in FIG. 13. The first processing unit 1110, the second processing unit 1120, and the hardware combiner 1130 may be implemented by using a processor 1310 shown in FIG. 13. The display unit 1140 may be implemented by using a display 1320 shown in FIG. 13. The transceiver unit 1150 may be implemented by using a transceiver 1330 shown in FIG. 13. Specifically, the processor is implemented by executing a computer program stored in a memory. Optionally, the memory is a storage unit in the chip, for example, a register or a cache. The storage unit may alternatively be a storage unit, such as the memory that is in the computer device and that is located outside the chip.

In an optional manner, when software is used for implementing data transmission, the data transmission may be completely or partially implemented in a form of a computer program product. The computer program product includes one or more computer instructions. When the computer program instructions are loaded and executed on a computer, the procedures or functions according to embodiments of this application are completely or partially implemented. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired manner (for example, a coaxial cable, an optical fiber, or a digital subscriber line (Digital Subscriber Line, DSL)) or a wireless manner (for example, infrared, radio, and microwave, or the like). The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a digital video disk (digital video disk, DVD)), a semiconductor medium (for example, a solid state disk (solid state disk, SSD)), or the like.

Method or algorithm steps described in combination with embodiments of this application may be implemented by hardware, or may be implemented by a processor by executing software instructions. The software instructions may include a corresponding software module. The software module may be stored in a RAM memory, a flash memory, a ROM memory, an EPROM memory, an EEPROM memory, a register, a hard disk, a removable hard disk, a CD-ROM memory, or a storage medium in any other form well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in a detection apparatus. Certainly, the processor and the storage medium may alternatively exist in the detection apparatus as discrete components.

The foregoing descriptions about implementations allow a person skilled in the art to clearly understand that, for the purpose of convenient and brief description, division of the foregoing functional modules is used as an example for illustration. In actual application, the foregoing functions can be allocated to different functional modules for implementation based on a requirement. That is, an inner structure of an apparatus is divided into different functional modules to implement all or some of the functions described above.

In an optional manner, this application provides a chip system. The chip system includes a processor and a memory. The memory stores instructions. When the instructions are executed by the processor, the method according to any one of the possible implementations provided in this application is implemented. The chip system may include a chip, or may include a chip and another discrete component.

In the several embodiments provided in this application, it should be understood that the disclosed electronic device and method may be implemented in other manners. For example, the foregoing apparatus embodiments are merely examples. For example, division of the modules or units is merely logical function division. During actual implementation, there may be another division manner. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may be one or more physical units, that is, may be located in one place, or may be distributed in a plurality of different places. Some or all of the units may be selected based on an actual requirement to achieve the objectives of the solutions of the embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the current technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of steps of methods in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An interface display method, applied to an electronic device, wherein the method comprises:
obtaining a first drawing instruction of a first interface;
when an interface attribute of the first interface comprises a complex attribute, inserting a complex drawing instruction into the first drawing instruction to obtain a second drawing instruction;
rendering the first interface based on the second drawing instruction;
after rendering the first interface, setting the interface attribute of the first interface to a non-complex attribute by modifying a parameter value in interface information that defines the complex attribute while maintaining a rendered visual appearance of the complex attribute; and
combining the first interface and a second interface by using a hardware combiner.

2. The method according to claim 1, wherein the complex attribute comprises one or more of the following: a rounded corner feature, a transparency feature, a multi-complex icon feature, or a multi-window/multi-layer feature; and
the non-complex attribute comprises an interface attribute other than the complex attribute.

3. The method according to claim 2, wherein:
the complex attribute comprises the rounded corner feature;
the complex drawing instruction is used to describe layer information corresponding to the complex attribute; and
the layer information comprises coordinate information of a rounded corner and a radius of the rounded corner.

4. The method according to claim 3, wherein inserting the complex drawing instruction into the first drawing instruction to obtain the second drawing instruction comprises:
obtaining an interface canvas of the first interface, wherein a layer corresponding to the first drawing instruction is drawn on the interface canvas;
drawing, on the interface canvas, a layer corresponding to the complex drawing instruction; and
obtaining the layer information on the interface canvas to obtain the second drawing instruction.

5. The method according to claim 2, wherein:
the complex attribute comprises the transparency feature;
the complex drawing instruction is used to describe layer information corresponding to the complex attribute; and
the layer information comprises coordinate information and transparency information of a transparency region.

6. The method according to claim 2, wherein:
the complex attribute comprises the multi-complex icon feature;
the complex drawing instruction is used to describe layer information corresponding to the complex attribute; and
the layer information comprises coordinate information and icon configuration information of a complex icon.

7. The method according to claim 2, wherein:
the complex attribute comprises the multi-window/multi-layer feature;
the complex drawing instruction is used to describe layer information corresponding to the complex attribute; and
the layer information comprises coordinate information of a window and a display style of the window.

8. The method according to claim 1, wherein:
the first interface is a first application interface; and
the second interface comprises one or more of the following: a home screen of the electronic device, a second application interface, a floating window interface, or a status bar of the electronic device.

9. The method according to claim 1, wherein obtaining the first drawing instruction of the first interface comprises:
drawing a layer corresponding to the non-complex attribute of the first interface to obtain the first drawing instruction.

10. The method according to claim 1, wherein the method further comprises:
displaying, by the electronic device, the first interface; or
sending, by the electronic device, a configuration parameter of the first interface to a further device to project the first interface onto the further device.

11. The method according to claim 1, further comprising:
after obtaining the first drawing instruction of the first interface, obtaining, by the electronic device, the interface attribute of the first interface by monitoring the interface information.

12. An electronic device, comprising:
one or more processors; and
a memory coupled to the one or more processors, the memory having processor-executable instructions stored thereon, wherein when executing the instructions, the one or more processors are configured to perform the following steps:
obtaining a first drawing instruction of a first interface;
when an interface attribute of the first interface comprises a complex attribute, inserting a complex drawing instruction into the first drawing instruction to obtain a second drawing instruction;

rendering the first interface based on the second drawing instruction;

after rendering the first interface, setting the interface attribute of the first interface to a non-complex attribute by modifying a parameter value in interface information that defines the complex attribute while maintaining a rendered visual appearance of the complex attribute; and combining the first interface and a second interface by using a hardware combiner.

13. The electronic device according to claim 12, wherein:

the complex attribute comprises one or more of the following: a rounded corner feature, a transparency feature, a multi-complex icon feature, or a multi-window/multi-layer feature; and the non-complex attribute comprises an interface attribute other than the complex attribute.

14. The electronic device according to claim 13, wherein:

the complex attribute comprises the rounded corner feature;

the complex drawing instruction is used to describe layer information corresponding to the complex attribute; and the layer information comprises coordinate information of a rounded corner and a radius of the rounded corner.

15. The electronic device according to claim 13, wherein:

the complex attribute comprises the transparency feature;

the complex drawing instruction is used to describe layer information corresponding to the complex attribute; and the layer information comprises coordinate information and transparency information of a transparency region.

16. The electronic device according to claim 13, wherein:

the complex attribute comprises the multi-complex icon feature;

the complex drawing instruction is used to describe layer information corresponding to the complex attribute; and the layer information comprises coordinate information and icon configuration information of a complex icon.

17. The electronic device according to claim 13, wherein:

the complex attribute comprises the multi-window/multi-layer feature;

the complex drawing instruction is used to describe layer information corresponding to the complex attribute; and the layer information comprises coordinate information of a window and a display style of the window.

18. The electronic device according to claim 12, wherein, the one or more processors, when executing the instructions, are further configured to implement the following step:

after obtaining the first drawing instruction of the first interface, obtaining, by the electronic device, the interface attribute of the first interface by monitoring the interface information.

19. The electronic device according to claim 12, wherein:

the first interface is a first application interface; and the second interface comprises one or more of the following: a home screen of the electronic device, a second application interface, a floating window interface, or a status bar of the electronic device.

20. A non-transitory computer-readable storage medium with instructions stored thereon, wherein the instructions, when executed by a computer, enable the computer to perform the following steps:

obtaining a first drawing instruction of a first interface;

when an interface attribute of the first interface comprises a complex attribute, inserting a complex drawing instruction into the first drawing instruction to obtain a second drawing instruction;

rendering the first interface based on the second drawing instruction;

after rendering the first interface, setting the interface attribute of the first interface to a non-complex attribute by modifying a parameter value in interface information that defines the complex attribute while maintaining a rendered visual appearance of the complex attribute; and combining the first interface and a second interface by using a hardware combiner.

\* \* \* \* \*